United States Patent
Holmes et al.

(10) Patent No.: US 11,772,978 B2
(45) Date of Patent: Oct. 3, 2023

(54) METHOD FOR SYNTHESISING MICROPARTICLES

(71) Applicant: UNIVERSITY COLLEGE CORK-NATIONAL UNIVERSITY OF IRELAND, CORK, Cork (IE)

(72) Inventors: Justin Holmes, Cork (IE); Michael Morris, Cork (IE); John Hanrahan, Cork (IE); Donal Keane, Cork (IE); Mark Copley, Cork (IE)

(73) Assignee: University College Cork-National University of Ireland, Cork, Cork (IE)

(*) Notice: Subject to any disclaimer, the term of this patent is extended or adjusted under 35 U.S.C. 154(b) by 65 days.

(21) Appl. No.: 16/860,970

(22) Filed: Apr. 28, 2020

(65) Prior Publication Data

US 2020/0255297 A1 Aug. 13, 2020

Related U.S. Application Data

(62) Division of application No. 12/668,859, filed as application No. PCT/IE2008/000074 on Jul. 14, 2008, now abandoned.

(30) Foreign Application Priority Data

Jul. 13, 2007 (IE) .................................... 2007/0511

(51) Int. Cl.
  *C01B 37/02* (2006.01)
  *C01B 33/12* (2006.01)
(52) U.S. Cl.
  CPC .............. *C01B 37/02* (2013.01); *C01B 33/12* (2013.01); *Y10T 428/2982* (2015.01)

(58) Field of Classification Search
  None
  See application file for complete search history.

(56) References Cited

U.S. PATENT DOCUMENTS 2,699,376 A * 1/1955 Hay ...................... B01J 20/103
                                                  423/335
2003/0143345 A1 * 7/2003 Satou .................. C01B 33/1435
                                                  428/32.1

OTHER PUBLICATIONS

Berezovska et al ("Template Synthesis of Porous Silica Adsorbents with Spherical Particle Morphologies," Adsorp Sci Tech. vol. 24 No. 5 (2006) pp. 403-410) (Year: 2006).*
Sayari ("Unprecedented Expansion of the Pore Size and Volume of Periodic Mesoporous Silica," Angew. Chem. (2000), 112, No. 16, pp. 3042-3044) (Year: 2000).*

(Continued)

*Primary Examiner* — Colin W. Slifka
*Assistant Examiner* — Michael Forrest
(74) *Attorney, Agent, or Firm* — Sigma-Aldrich Co. LLC

(57) ABSTRACT

A method for synthesizing mesoporous silica microparticles comprising the steps of: preparing a sol from an ammonium catalyzed hydrolysis and condensation reaction of a pre-sol solution comprising a silica precursor and a structure directing agent dissolved in a mixed solvent system comprising an alcohol and water to produce mesoporous particles of silica with an average diameter of up to about 50 μm; hydrothermally treating the particles to increase the pore size; treating the particles to remove residual structure directing agent; and further increasing the pore size using controlled dissolution.

9 Claims, 18 Drawing Sheets

(56) References Cited

OTHER PUBLICATIONS

Buchel et al (Tailored Synthesis of nanostructured silicas: Control of particle morphology, particle size and pore size, Supramolecular Sci. 5 (1998) 253-259) (Year: 1998).*
Liu et al ("The Influence of the Alcohol Concentration on the Structural Ordering of Mesoporous Silica: Cosurfactant versus Cosolvent", J. Phys. Chem. B (2003), 107, 10405-10411). (Year: 2003).*
Ma et al ("Large-pore mesoporous silica spheres: synthesis and application in HPLC", Colloids and Surfaces A: Physicochem. Eng. Aspects 229 (2003) 1-8). (Year: 2003).*
Pettito et al ("Synthesis of Discrete Spherical Particles of MCM-48", Chem. Mater. (2005), 17, 2120-2130). (Year: 2005).*

\* cited by examiner

METHOD FOR SYNTHESISING MICROPARTICLES

CROSS-REFERENCE TO RELATED APPLICATIONS

This application is a divisional application of U.S. application Ser. No. 12/668,859, filed Jun. 29, 2010, which is a US National stage of PCT Application No. PCT/IE2008/000074, filed Jul. 14, 2008, which claims priority from Ireland Application No. 2007/0511, filed Jul. 13, 2007, the contents of all of which are hereby incorporated by reference in their entirety.

FIELD OF THE INVENTION

The invention relates to a method for the synthesis of porous silica particles with micrometer diameters.

INTRODUCTION

High-performance liquid chromatography (HPLC) is currently the most commonly applied technique for separating and analyzing multi-component mixtures. However, the chromatographic industry is on the verge of radical change. The development of pumping technology and more sensitive detection systems has opened up a new field of HPLC known as ultra high-performance liquid chromatography (UHPLC). The shorter run times achieved by UHPLC, compared to HPLC, are possible by faster elution of the sample through a silica stationery phase composed of particles with diameters below 2 μm, typically between 1.1-1.9 μm.

In recent years, improvements in chromatographic efficiency and analysis time have been demonstrated by the use of small stationary-phase support particles (<2 μm) packed into relatively long (>20 cm) fused-silica capillary columns. This technique has been termed UHPLC because of the extreme pressures required to force the mobile phase through these columns (typically>1400 bar). In 1975, Halasz et al.[1] postulated that the fastest separations could be obtained by employing the smallest particles, i.e., below 1 μm, and that the minimum analysis time for a given separation was only limited by the available inlet column pressure. Most conventional pumping systems have upper pressure limits of approximately 400 bar, thus limiting columns packed with 5 μm particles to lengths of approximately 25 cm, and limiting columns employing 1.5 μm particles to a mere 3-4 cm. These columns usually produce 10,000-20,000 theoretical plates under typical operating conditions. Theory predicts an increase in the efficiency of a column with decreasing particle size due to reduced eddy diffusion and resistance to mass-transfer contributions that can typically cause band broadening.[2,3]

With conventional HPLC systems, the use of small particles has been limited to short, fast separations of simple mixtures. To work with longer columns, pumps that can achieve higher pumping pressures than conventional pumping systems are required. The pressure drop ($\Delta P$) necessary to flow a mobile phase at the optimum linear velocity ($u_{opt}$) through the packed bed increases at a rate inversely proportional to the particle diameter cubed, assuming constant mobile-phase viscosity and column length. For instance, flow at $u_{opt}$ requires 125 times greater liquid pressure at the head of a column packed with 1 μm particles than for a column of equal length packed with 5 μm particles. The benefits however are a 5-fold increase in theoretical plates (N) and a 5-fold decrease in analysis time.

The task of acquiring porous silica particles in the 1-2 μm size range suitable for UHPLC has proven to be a challenge as it is difficult to form high yields of porous particles with mean diameters below 2 μm that have a narrow size distribution. Conventionally to obtain a batch of particles in the 1 μm size range, size-monodisperse enough for UHPLC, it is necessary to separate out the desired particles which is a very time consuming process. Furthermore, the particles have to be mechanically strong to withstand the high mobile-phase shear imposed by ultra-high pressures.

Additionally, as commercial HPLC systems are not generally capable of operating at pressures above 400 bar, there have been very few commercial sources for porous particles in the 1-2 μm size range. Porous ethyl-bridged hybrid particles have recently been developed by Waters Corporation.[4] These particles have an average pore diameter of 14.5 nm, making them suitable for peptide separations. The surface area of these particles however remains below 200 $m^2g^{-1}$, which is low for UHPLC requirements. The stability of these materials is also questionable at the high pressures that are involved in UHPLC and they are not seen as suitable long term replacement for porous silica particles.

Synthesizing Silica Spheres via Ammonia Hydrolysis

Since the report of surfactant templated silica (STS) in the early nineties[5,6] much effort has been made to control its bulk morphology. Various morphologies can be generated utilizing sol-gel processing techniques.[7] In particular, the synthesis of spherical mesoporous silica with well defined and tunable particle diameters has received much recent interest especially in chromatographic separations.[8] In 1968, Stöber, Fink and Bohn (SFB) reported a system which results in non-porous monodisperse silica spheres in the micron size range by the ammonia catalyzed reaction of alkyl silicates in alcoholic solutions,[9] and U.S. Pat. No. 3,634,558 describes a process for producing non-porous monodisperse silica spheres of uniform size by agitating an aqueous alcoholic solution containing ammonia and lower alkyl tetraesters of silicic acid.

EP 0 844 949 describes a process for the production of porous spherical microparticles consisting of pure $SiO_2$ having a mean particle diameter of $d_{50}$ of 0.05 to 10 μm, a standard deviation of the particle diameter of at most 15% and a pore width of 2-20 nm comprising the steps of hydrolyzing and polymerizing mixtures comprising tetraalkoxysilanes and trialkoxysilanes, isolating the particles thus formed and heating the isolated particles to a temperature between 600 and 1300° C. to form pores. In such a process, radicals, for example $C_2$-$C_{25}$-albyl, $C_6$-$C_{14}$-aryl, $C_7$-$C_{25}$-alkylaryl or $C_1$-$C_{25}$-arylalkyl, are used to burn holes in the spherical silica particles. Such a method may result in a non-uniform distribution of pores and pores of greatly varying size depending on the amount of and location of radicals in the pre-formed spherical particles.

In 1997, Unger et al.[10] combined the SFB method with the surfactant templating approach to produce mesoporous MCM41 silica microspheres in the micron size range. This so called 'modified' SFB (m-SFB) system consists of five reagents: a metal oxide precursor, water, an alkaline catalyst, alcohol and a surfactant. By empirically relating the initial synthesis conditions to the final product, silica particles with varying morphology, size, size distribution, degree of aggregation and mesophase have been produced.[11,12] Thus, a desired particle size may be 'tailored' by controlling reactant stoichiometry and experimental conditions such as temperature, reaction time, batch size and type, stirring speed etc.

Pore size modification of STS has been widely investigated since its first report and a summary of many of the strategies employed can be found in the literature.[7,13,14] However, the application of many of these methods to the m-SFB system results in loss of particle size control or particle aggregation. Techniques used to achieve a larger pore size in direct synthesis (prior to addition of metal oxide precursor) is a major challenge as any change to the reactant stoichiometry can result in a different particle size and distribution. Hydrothermal treatments of uncalcined, non-spherical, mesoporous silica (MCM-41) have been found to increase the pore size whilst maintaining crystalline quality. Sayari et al.[14] increased the degree of expansion by using amines as swelling agents in the hydrothermal treatment of porous silica, albeit with a loss of pore order. Post-synthesis hydrothermal treatments in particular, may be applied to the m-SFB system to increase the pore size without particle aggregation. For example, Grun et al.[18] discloses a process for producing designed mesoporous silica absorbants comprising the steps of synthesizing mesoporous silica particles with an average diameter of 0.1-2.3 µm and an average pore diameter of 2.5-3.5 nm by the hydrolysis and condensation of tetra-n-alkaysilanes and an n-alkylamine in the presence of an ammonia catalyst and calcining the formed particles to remove any remaining n-alkylamine template. The resultant particles are then exposed to hydrothermal treatment to enlarge the average pore diameter to about 6.7 nm. However, for use in adsorption and chromatographic processes a larger pore diameter is required to avoid size exclusion effects. For example pore sizes in the region of >10 nm are required for UHPLC.

STATEMENTS OF INVENTION

According to the invention, a wet chemistry method is provided for synthesizing mesoporous silica microparticles comprising the steps of:
  preparing a sol from an ammonium catalyzed hydrolysis and condensation reaction of a pre-sol solution comprising a silica precursor and a structure directing agent dissolved in a mixed solvent system comprising an alcohol and water to produce mesoporous particles of silica with an average diameter of up to about 50 µm;
  hydrothermally treating the particles to increase the pore size;
  treating the particles to remove residual structure directing agent; and
  further increasing the pore size using controlled dissolution.

The mesoporous particles may have an average diameter of up to about 5 µm such as between about 0.1 µm to about 3 µm.

The step of further increasing the pore size using controlled dissolution may be repeated at least once.

The porous particles may be hydrothermally treated in an organic compound-water emulsion. The organic compound to water ratio may be between 1 v/v % and 10 v/v %.

The organic compound may be an amine such as a neutral amine. For example the amine may be selected from one or more of the group comprising: N,N-Dimethyldecylamine, Trioctylamine, trimethylamine, tridodecylamine and triethylamine. In one embodiment, the amine may be N,N-Dimethyldecylamine.

Alternatively, the organic compound may be an alcohol. For example, the alcohol may be selected from one or more of the group comprising: heaxanol, octanol, decanol and dodecanol.

The porous particles may be hydrothermally treated at a temperature of between about 70° C. and about 150° C. For example, about 110° C.

The controlled dissolution step may comprise an etching process. The etching process may utilize a base catalyst. For example the controlled dissolution step may be considered as a base etching step. The base catalyst may be one or more selected from the group comprising: ammonium hydroxide ($NH_4OH$), sodium hydroxide (NaOH), potassium hydroxide (KOH), lithium hydroxide (LiOH), and calcium hydroxide (CaOH).

The base catalyst may be present in a concentration of between about 0.01 M and about 1 M. For example, the base catalyst may be present in a concentration of about 0.05 M.

The particles may be etched for up to about 12 hours or for between 1 day and 5 days. For example, 3 days.

The particles may be etched at a temperature of about 50° C.

The etching process may comprise a silica chelating or complexing agent. The silica chelating or complexing agent may be present in a concentration of about 0.5M. The silica chelating or complexing agent may be catechol.

The particles may be treated with heat to remove residual structure directing agent. For example, the particles may be heated at a temperature between about 400° C. and about 800° C. to remove residual structure directing agent. Alternatively the particles may be treated by microwave irradiation to remove residual structure directing agent.

The particles may be treated in air. Alternatively, the particles may be treated in an air-ozone mixture. The particles may be treated for between about 1 hour and about 24 hours. For example, the particles may be treated for at least 8 hours.

In one embodiment, the particles may be treated in the presence of an alcohol. For example an alcohol selected from one or more of the group comprising: ethanol, methanol, 1-propanol and 2-propanol. In such an embodiment, the particles may be treated by microwave irradiation.

The structure directing agent may be a surfactant for example a cationic surfactant. The surfactant may have the structure:

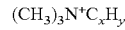
$(CH_3)_3N^+C_xH_y$ wherein: x is an integer between 12 and 20; and
  y is an integer between 23 and 41.
The surfactant may be cetyltrimethylammonium bromide (CTAB).

The alcohol of the mixed solvent system may be one or more selected from the group comprising: ethanol, methanol, 1-propanol, 2-propanol and 1-butanol.

The silica precursor may be one or more selected from the group comprising: tetraethoxysilane (TEOS). tetramethoxysilane (TMOS), tetrapropoxysilane (TPOS), tetrabutoxysilane (TBOS), tetra-acetoxysilane and tetrachlorosilane or an organic derivative thereof.

The organic derivative may have the formula:

$R_nSiX_{(4-n)}$ wherein: R is an organic radical;
  X is a hydrolysable group selected from one or more of the group comprising: halide, acetoxy, alkoxy, teramethysilane and tetraethysilane; and
  n is an integer between 1 and 4.

The silica precursor may be a hybrid silica precursor, such as one or more selected from the group comprising dimethyldimethoxysilane, methyltriethoxysilane, methyltrimethoxysilane, ethyltrimethoxysilane, n-propyltrimethoxysilane, isobutyltrithoxysilane, isobutyltrimethoxysilane, phenyltrirnethoxysilane, n-octyltriethoxysilane, and iso-octyltrimethoxysilane.

The hybrid silica precursor may be a bridged hybrid silica precursor having the general formula:

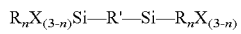

wherein: R is an organic radical;
X is a hydrolysable group such as halide, acetoxy, alkoxy, trimethysilane, or tetraethysilane;
R' is a bridging group such as methyl, ethyl, propyl or butyl; and
n is 1 or 2

The ammonia catalyst may be ammonium hydroxide.

The pre sol solution may contain from 0.001 moles to 0.08 moles of silica precursor.

The pre sol solution may contain from 0.001 moles to 0.006 moles of structure directing agent.

The pre sol solution may contain from 8 moles to 14 moles of alcohol.

The pre sol solution may contain from 2 moles to 10 moles of water.

The pre sol solution may contain from 0.05 moles to 1.5 moles of ammonia catalyst.

In one embodiment, the pre sol solution may contain the mole ratio of silica precursor:structure directing agent:alcohol:water:ammonia catalyst of about 0.0359:0.0032:12.36:6.153:0.505.

In a further embodiment, the pre sol solution may contain the mole ratio of silica precursor:structure directing agent:alcohol:water:ammonia catalyst of about 0.0359:0.0032:12.36:0.0159:6.153.

The pre-sol solution may be heated to a temperature of between about −5° C. and about 80° C. For example, pre-sol solution may be heated to a temperature of between about −5° C. and about 80° C. for up to 2 hours. The pre-sol solution may be agitated.

The method may further comprise the step of adding a dopant compound to the pre-sol solution. The dopant compound may comprise aluminium or boron. For example the dopant compound may be selected from one or more of the group comprising aluminium nitrate, aluminium isopropoxide and triethyl borane.

The steps of the method may be carried out in sequence.

The invention also provides for mesoporous silica microparticles produced by the method of the invention.

The invention may further provide a chromatography stationary phase comprising mesoporous silica produced by the method of the invention.

The invention may also provide discrete mesoporous silica microparticles with an average particle diameter of about 0.1 μm to about 3 μm and an average pore diameter of at least about 7.1 nm. The invention further provides for discrete mesoporous silica microparticles with an average particle diameter of about 0.1 μm to about 3 μm and an average pore diameter between about 7.1 nm to about 20.1 nm. The discrete mesoporous silica microparticles may have an average pore volume between about 0.3 cm$^3$g$^{-1}$ and about 1 cm$^3$g$^{-1}$. The discrete mesoporous silica microparticles may have a surface area between about 100 m$^2$g$^{-1}$ and about 1000 m$^2$g$^{-1}$. The pores of the discrete mesoporous silica microparticles may be ordered in a random direction. The discrete mesoporous silica microparticles may be in the form of spheres.

The invention may further provide discrete mesoporous silica microparticles with an average particle diameter of about 3 μm to about 50 μm and an average pore diameter of at least about 7.1 nm. The invention may also provide discrete mesoporous silica microparticles with an average particle diameter of about 3 μm to about 50 μm and an average pore diameter of between about 7.1 nm to about 20.1 nm. The discrete mesoporous silica microparticles may have an average pore volume between about 0.3 cm$^3$g$^{-1}$ and about 1 cm$^3$g$^{-1}$. The discrete mesoporous silica microparticles may have a surface area between about 100 m$^2$g$^{-1}$ and about 1000 m$^2$g$^{-1}$. The pores of the discrete mesoporous silica microparticles may be ordered in a random direction. The discrete mesoporous silica microparticles may be in the form of spheres.

The invention may also provide discrete mesoporous silica hybrid microparticles with an average particle diameter of about 0.1 μm to about 50 μm and an average pore diameter of at least about 7.1 nm. The invention may further provide discrete mesoporous silica hybrid microparticles with an average particle diameter of about 0.1 μm to about 50 μm and an average pore diameter of between about 7.1 nm to about 20.1 nm. The discrete mesoporous silica hybrid microparticles may have an average pore volume between about 0.3 cm$^3$g$^{-1}$ and about 1 cm$^3$g$^{-1}$. The discrete mesoporous silica hybrid microparticles may have a surface area between about 100 m$^2$g$^{-1}$ and about 1000 m$^2$g$^{-1}$. The pores of the discrete mesoporous silica hybrid microparticles may be ordered in a random direction. The discrete mesoporous silica hybrid microparticles may be in the form of spheres.

Definition

A porous particle comprises a sphere, rod, disc or rope and is taken to include a particle in which the pores that are arranged within the particle are in a random or ordered arrangement.

The term macroscopic is taken to include sizes of the order of 100 nm and greater.

An organic template is taken to include a defined structural arrangement originating from the assembly of surfactant molecules in a solvent as defined by the solvent-surfactant interactions. The organic template can also be described as a structural directing agent (SDA).

Typical surfactants used as mesoporous SDAs are cationic surfactants, typically cetyltrimethylammonium bromide (CTAB).

A silica precursor is a chemical compound that can be reacted with other chemical compounds to produce a silica material. This silica will form around the organic template structure to form an inorganic silica skeleton which will survive treatments to remove the organic SDA component. An example of a silica precursor is a metal alkoxide such as tetraethoxysilane (TEOS). In the presence of the SDAs, solvent and other materials, TEOS hydrolyses to yield a molecule and molecular assemblies containing hydroxide groups. These hydroxyl groups containing species react by elimination of water to produce -M-O-M- (M representing a metal ion and O and oxygen ion) bonds. This process is known as condensation. The product of the condensation reaction is a poorly chemically, structurally and stoichiometrically defined solid or gel containing silica oxide, silica hydroxide and metal-organic bonds. A dilute gel which flows easily on pouring is termed a sol.

A pre-sol is a mixture of chemicals which under certain conditions will react to form a sol of mesoporous silica particles.

Calcination is described as a thermal treatment under air. As an alternative, mixtures of air and ozone may be used as this ensures complete removal of organic materials.

BRIEF DESCRIPTION OF DRAWINGS

The invention will be more clearly understood from the following description thereof given by way of example only with reference to the accompanying figures in which.

DETAILED DESCRIPTION

Figure 1:
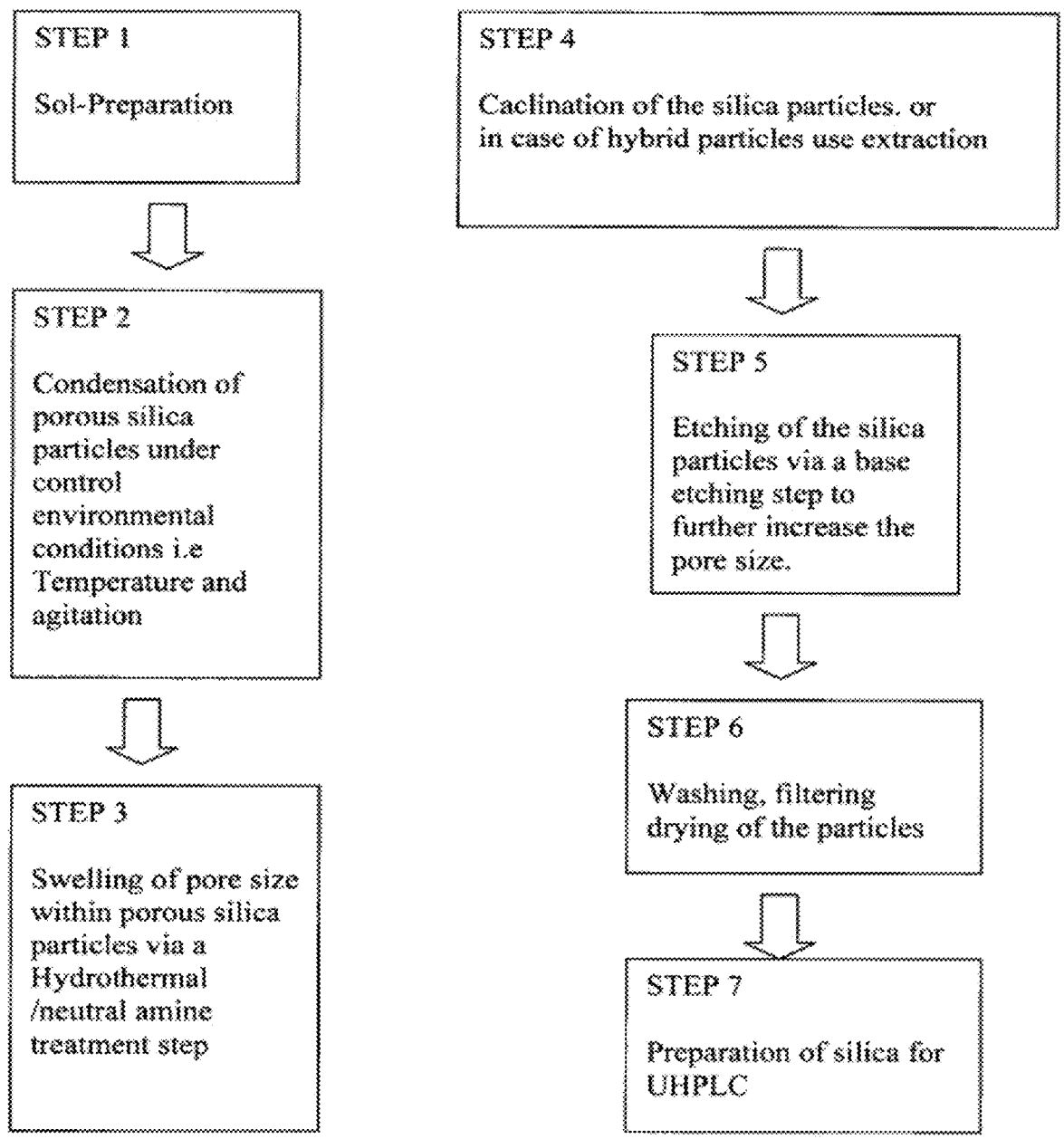
FIG. 1 is a flow diagram illustrating a process according to the invention.

We have devised a simple and reproducible method for synthesizing discrete size-monodisperse micrometer porous particles with an average size of up to about 50 μm such as up to about 5 μm or with an average size in the range of about 0.1 to about 3 μm. The method allows the preparation of uniform particles, with tunable mesoporous and macroscopic morphologies, in particular porous silica particles in the form of spheres.

By careful control of the reaction conditions, such as the concentration and type of surfactants, temperature, agitation speed, hydrothermal treatment and base etching (controlled dissolution) steps, the pore size and structure of the porous spheres can be predetermined.

Using the method of the invention we are able to prepare macroscopic mesoporous materials of regular, predictable and controlled shape. Previously the control of both the macroscopic and mesoporous properties of such materials has been difficult to achieve on a consistent basis.

Advantageously, the method of the invention produces a high yield of mesoporous particles. For example 2.5 l of sol may yield about 20 g of mesoporous particles.

The method provides mesoporous particles with a narrow size distribution. Such materials have large surface areas and are very effective for use in chromatographic, absorbent and separation applications.

Porous silica particles with an average size of up to about 50 μm or up to about 5 μm or with an average size in the range of about 0.1 to about 3 μm offer a number of advantages over current commercially available porous silica spheres which include:

1) Monodispersed particle sizes
2) Tunable pore size
3) No need for hydrogen fluoride (HF) etching to increase pore size
4) No subsequent separation steps i.e. sieving 5) No Bimodal Pore size distributions
6) High yield
7) Relatively Short Preparation Time (1 week)

The mesoporous materials of the invention may also be relevant to the catalysis industry as support materials and to the general materials market, including highly specific chemical sensors and opto-electronic devices.

Mesopore dimensions may be tuned utilizing a water-amine emulsion hydrothermal technique and subsequent base etching techniques such as sodium hydroxide or ammonium hydroxide base etching. Spherical particles are produced in a similar manner to those reported by Shimura et al.[12] In the preparation, micelles formed from cationic surfactants, such as CTAB, are mixed with a silica precursor, such as tetraethoxysilane (TEOS), under basic conditions (termed a pre-sol solution) and processed to form mesoporous materials. By changing the base conditions, stirring speed and temperature relatively size-monodisperse spherical particles with tunable macroscopic diameters up to about 50 μm such as up to about 5 μm or between about 0.1 and about 3 μm can be formed. The resultant particle size can be controlled by controlling the experimental conditions of the process such as the volume of silica precursor or volume of catalyst or volume of solvent or the reaction temperature of the process. For example by controlling the amount of ammonia in the pre-sol solution, the resultant particle size can be determined. We have found that 0.0159 moles of ammonia results in particles with an average diameter of about 2.45 μm whereas 0.3971 moles of ammonia produces particles with an average diameter of about 0.49 μm. FIGS. 4A to E show the effect of increasing the volume of silica precursor (TEOS in the example of FIG. 4A): the effect of increasing the volume of catalyst (Ammonia in the example of FIG. 4B); the effect of increasing the volume of solvent (methanol in the example of FIG. 4C); the effect of increasing the mass of poreogen (CTAB in the example of FIG. 4D) and the effect of increasing temperature (FIG. 4E) on the resultant particle size. Referring to FIGS. 4A to 4E, alteration of the temperature at which the reaction takes place appears to have the most dramatic effect on particle size with a temperature of less than about 10° C. appearing to be optimum for producing larger particle sizes and a temperature of about 50° C. appearing to be optimum for producing particles with an average size of about 1 μm or less. A temperature of below about 0° C. may be utilized to produce even larger particles. For example referring to FIG. 10, a temperature of about −17° C. produces particles with an average size of about 4.7 μm and with particle sizes ranging from about 3.82 μm to about 5.52 μm.

We envisage that temperatures of about −100° C. or less will produce particles with an average size of about 10 μm or more, for example up to about 50 μm.

Resultant particle size may also be controlled by altering two or more experimental parameters.

We envisage that large particles, such as particles with an average size of about 20 μm or more, for example up to about 50 μm could be produced using a seeded growth method. In a seeded growth method, particles obtained from the process described herein (Step 2 of FIG. 1) are immersed in a fresh sol preparation (Step 1 of FIG. 1) such that a new layer of silica is grown on the existing particles thereby increasing the average size of the particles. The average size of particles may be further increased by performing additional seeded growth steps. Once particles have been grown to the desired size they can be processed as described in steps 3 to 6 of FIG. 1. The preparation of particles using the seeded growth method may result in particles having a core-shell structure.

Post synthesis treatment of the silica powder via an amine-water emulsion under hydrothermal conditions results in the controlled swelling of the mesopores to between about 2 and about 4 nm. The invention provides a method for synthesizing swelled mesoporous silica materials with tunable mesoporous diameters. Further post synthesis treatment using a base etch (controlled dissolution) solution further increases the pore size of the silica powders to between about 4 nm to about 50 nm.

The method has the following advantages over mesoporous silica spheres synthesized by other procedures:
i) particles can be produced which are spherical and relatively size-monodisperse allowing for efficient column packing. The particles themselves are discrete and not aggregated or linked as reported in a number of other methods.
ii) the particles are thermally (up to about 850° C.), mechanically and chemically robust.
iii) the mesopore diameters of the particles can be controlled between about 2 and about 50 nm.
iv) the mesoporous particles act as effective stationary phases for chromatographic separations.

The surfactants used may be, but are not limited to, any one or more of cationic surfactants, e.g. cetyltrimethylammonium bromide (CTAB), diblock (A-B) or triblock copolymers (A-B-A or A-B-C), with polyethylene oxide (PEO), polypropylene oxide (PPO) or polybutylene oxide (PBO) segments, polyalkyl ethers, e.g. $C_xH_{2x+1}$—$(CH_2$—$CH_2O)_zH$ ($C_xEO_y$) such as Brij surfactants, anionic surfactants, such as sodium bis (2-ethylhexyl) sulfosuccinate (AOT) and Triton-X.

The alcohol-type solvent used may be, but is not limited to, any one or more of methanol, ethanol, propanol or butanol.

A suitable silica precursor may be, but is not limited to, any one or more of tetraethoxysilane (TEOS), tetramethoxysilane (TMOS), tetrapropoxysilane (TPOS), and tetrabutoxysilane (TBOS), tetra-acetoxysilane, tetrachlorosilane or organic derivative thereof represented by the formula $R_nSiX_{(4-n)}$ where R is an organic radical and X is a hydrolysable group such as halide, acetoxy, alkoxy, teramethylsilane, tetraethysilane, and n is an integer between 1 and 4.

Hybrid silica precursors may also be used in the process of the invention to produce porous hybrid silica microparticles. By "hybrid silica particles" we mean silica particles that contain a percentage of organic component within the structure such as silica particles with organic functionality. The organic functionality may be within the silica particle (internal) and/or linked to the surface of the silica particle (external). A suitable hybrid silica precursor may be, but is not limited to, any one or more of, dimethyldimethoxysilane, methyltriethoxysilane, methyltrimethoxysilane, ethyltrimethoxysilane, n-propyltrimethoxysilane, isobutyltriethoxysilane, isobutyltrimethoxysilane, phenyltrimethoxysilane, n-octyltriethoxysilane, and isooctyltrimethoxysilane.

Bridged hybrid precursors may also be used in the process of the invention to produce porous hybrid silica microparticles.

A suitable bridged silica may be, but is not limited to

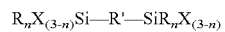

wherein: R is an organic radical;

X is a hydrolysable group such as halide, acetoxy, alkoxy, teramethysilane, tetraethysilane;

R' is a bridging group and may be but not exclusive of a methyl, ethyl, propyl, butyl; and n is 1 or 2

An example of a bridged hybrid silica precursor is 1,2-Bis (triethoxysilyl)ethane.

A suitable amine porogenic swelling agent may be, but is not limited to, any one or more of N,N-Dimethyldecylarnine, Trioctylamine, trimethylamine, tridodecylamine and trimethylamine.

The silica source used to prepare the sol may be, but is not limited to, an alkoxide, carboxylate or halide of silicon.

A suitable base etch solution may be, but is not limited to, hydroxides of sodium, potassium and ammonium.

A suitable silica chelating agent/complexing agent may be but is not limited to, organic diols such as catechol (1,2 benzenediol).

Control of the pre-sol conditions pre-determine the macroscopic particle size of the particles. Decreased concentration of the base hydrolysis agent yields larger particles, whilst increased temperature yields smaller particles.

The invention will be more clearly understood by the following examples thereof.

EXAMPLES

Example 1

Mesoporous silica particles are prepared in several stages, as represented schematically in FIG. 1 and described below:

Step 1: CTAB (about 0.001 to about 0.006 moles, typically about 0.0032 moles) is first dissolved in methanol (at a concentration of about 8 to about 14 moles, typically about 12.36 moles). Ammonia (about 0.05 to about 1.5 moles, typically 0.505 moles) and water (about 2 to about 10 moles, typically about 6.153 moles) are added to the mixture and stirred for 15 minutes before the one step addition of TEOS (about 0.001 to about 0.08 moles, typically about 0.00826 moles). The silica precursor is typically present at a concentration of between about 5 to about 25% v/v of the pre-sol). The sol is allowed to stir for between 24 and 96 hours. The pre-sol solution may be prepared at temperatures between −5 and 80° C. and agitation speed of between 0 and 1000 rpm. The pre-sol solution should be clear and free from any visible particles to produce high quality porous particles.

When the process is used to make hybrid silica particles the TEOS may be replaced with a suitable hybrid silica precursor. Alternatively, when making bridged hybrid silica particles the silica precursors may comprise a mixture of a bridged hybrid silica precursor and a non-hybrid silica precursor for example TEOS. When using a mixture of bridged hybrid silica precursors and non-hybrid silica precursor, the non-hybrid silica precursor may be present at a concentration of between about 5 to about 25% v/v of the pre-sol solution.

Step 2: The silica precipitate is separated by filtration (vacuum filtration through a Whatman 110 mm diameter filter paper) and dried at room temperature to produce an as synthesized silica powder of porous silica particles.

Step 3: An emulsion of DMDA in $H_2O$ (3.3% v/v) is prepared by vigorously stirring known amounts of DMDA in water for 1 hour. As synthesized silica powder (2.5% w/w) from step 2 is added to the emulsion and stirred for a further hour. The solution is then transferred to a closed hydrothermal container and treated at about 110° C. for 1 week under autogenous pressure. A color change from white to brown is observed.

Step 4: The porous silica particles are removed from the hydrothermal process of step 3, washed, filtered, air dried for up to 4 days and calcined at temperatures between about 200 and about 550° C. for periods of a few minutes to several days in air or air/ozone mixtures. Alternatively, the particles are exposed to microwave irradiation between about 40 and about 1000 watt in the presence of a solvent which in most cases is an alcohol to extract the SDA. For hybrid silica particles, microwave irradiation may be used to extract the SDA. Oxide particles are formed which consist of open pores, i.e. no organic surfactant is present.

Step 5: The hydrothermally treated and calcined particles (1% w/w) are base etched. The calcined particles may be added to a 0.05 M sodium hydroxide base etch solution and agitated for about 3 days. Alternatively, the calcined particles may be base etched using an ammonium hydroxide base etch solution for example a base etch solution comprising about 14.8M ammonium hydroxide and agitated for about 8 hours. The base etch step may be performed at a temperature of about 50° C. Optionally, a silica chelating agent or complexing agent can be included in the base etching solution which may reduce the likelihood of Ostwald ripening of the etched particles. As an example Catechol may be added to the base etch solution at a concentration of about 10 v/v %. Catecol may be included in the base etching solution when the base etching catalyst is a hydroxide of sodium or ammonium.

The rate of the base etching step (controlled dissolution of silica) can be controlled by controlling one or more of the reaction parameters such as time, temperature, concentration of base etching catalyst, concentration of silica chelating agent or complexing agent, and the agitation conditions.

Step 6: The etched particles are separated by filtration (vacuum filtration through a Whatman 110 mm diameter filter paper) and dried at 200° C.

Step 7: The porous particles can be packed into traditional chromatography columns, with typical dimensions such as diameter 1.0 cm and length 30 cm, using traditional 'wet filling' techniques, i.e. the mesoporous silica is wetted with a solvent to produce a slurry which is delivered into the column. A liquid sample of the mixture to be chromatographed is dissolved in a solvent, typically dichloromethane, and placed on top of the column. The starting column solvent (hexane in the first two cases) is then placed into the column. A hand pump can then be used to generate the required pressure to force the solvent through the column to separate the mixture's components.

Example 2

Preparation of Mesoporous Silica Spheres

Mesoporous silica spheres were prepared based on modified methods described by Shimura et al.[12] and Unger et al.[15] Tetraethoxysilane (TEOS) was used as the silica precursor, while cetyltrimethylammonium bromide (CTAB) acted as the surfactant template. Methanol (MeOH) was used as the co-solvent.

In a typical reaction, 1.25 g of CTAB was mixed in a 2 L beaker with 88 ml of $H_2O$ and 500 ml of methanol and was left stirring (200 rpm) for 10 mins. 32 ml of $NH_4OH$ was then added to the solution and the system was left stirring for a subsequent 10 mins. Finally 8 ml of TEOS was added to the solution in a one step addition and the stirring speed increased to 300 rpm. The reaction temperature was controlled at 16° C. The liquid suspension was filtered from the beaker after 24 hours and was subsequently washed with MeOH. It was air-dried at room temperature for 2 hours. A known mass of the as-synthesized material was then added to a pre-prepared agitated water-DMDA (3.3% v/v) emulsion system. After subsequent agitation for 1 hour the contents were transferred to a hydrothermal cell and placed in a 110° C. oven for 6 days. Calcination of the surfactant template was performed at 550° C. for 8 hr. The calcined product was then placed in a 0.05 M NaOH (1% w/w) solution and agitated at 200 rpm for 3 days, filtered and dried at 200° C. The Silica particles were 'etched' for a second time (under the same conditions: 0.05 M NaOH (1% w/w) solution and agitated at 200 rpm for 3 days) to further increase pore size, filtered and dried at 200° C. Table 1 illustrates the molar composition and physiochemical properties of a variety of silica particles synthesized.

TABLE 1

Physiochemical properties of synthesized silica particles prepared from a mole ratio of TEOS:CTAB:MeOH:NH$_3$:H$_2$O of 0.0359:0.0032:12.36:0:505:6.153

| Sample | $w_{BJH}$/nm | $S_{BET}$m$^2$g$^{-1}$ | $V_{BJH}$/cm$^3$g$^{-1}$ |
|---|---|---|---|
| Untreated | 1.78 | 704 | 0.45 |
| DMDA Treated | 4.72 | 599 | 0.74 |
| Base Etch Treated | 7.10 to 8.1 | 197 to 305 | 0.448 to 0.777 |
| Base Etch Treated 2 | 12.1 to 20.6 | 179 to 201 | 0.675 to 0.87 |

Note:
Average pore diameter ($w_{BJH}$), surface area ($S_{BET}$), and pore volume ($V_{BJH}$) calculated from nitrogen adsorption measurements. (1 nm is equivalent to 10 Å)

Example 3

Preparation of Mesoporous Silica Spheres

Mesoporous silica spheres were prepared based on modified methods described by Shimura et al.[12] and Unger et al.[15] Tetraethoxysilane (TEOS) was used as the silica precursor, while cetyltrimethylammonium bromide (CTAB) acted as the surfactant template. Methanol (MeOH) was used as the co-solvent.

In a typical reaction, 1.25 g of CTAB was mixed in a 2 L beaker with 88 ml of H$_2$O and 500 ml of methanol and was left stirring (200 rpm) for 10 mins. 32 ml of NH$_4$OH was then added to the solution and the system was left stirring for a subsequent 10 mins. Finally 8 ml of TEOS was added to the solution in a one step addition and the stirring speed increased to 300 rpm. The reaction temperature was controlled at 16° C. The liquid suspension was filtered from the beaker after 24 hours and was subsequently washed with MeOH. It was air-dried at room temperature for 2 hours. A known mass of the as-synthesized material was then added to a pre-prepared agitated water-DMDA (3.3% v/v) emulsion system. After subsequent agitation for 1 hour the contents were transferred to a hydrothermal cell and placed in a 110° C. oven for 6 days. Calcination of the surfactant template was performed at 550° C. for 8 hr.

The calcined product was then placed in a sodium hydroxide solution under the conditions listed in Table 2 below and agitated at 200 rpm and 50° C. for the time indicated in Table 2 below. Following sodium hydroxide etching, the particles were filtered and dried at 200° C.

Particles with the following properties were synthesized:

TABLE 2

Physiochemical properties of synthesized silica particles prepared from a mole ratio of TEOS:CTAB:MeOH:NH$_3$:H$_2$O of 0.0359:0.0032:12.36:0:505:6.153

| Sample I.D | $S_{BET}$/ m$^2$g$^{-1}$ | $V_{BJH}$/ cm$^3$g$^{-1}$ | $w_{BJH}$/ nm | w/v % SiO$_2$:NH$_4$OH | Temp/ ° C. | Etching Time/ hrs |
|---|---|---|---|---|---|---|
| NH3002 | 352 | 0.52 | 116 | 1 | 50 | 3 |
| NH3004 | 117 | 0.3 | 157 | 5.7 | 50 | 6.5 |
| NH3005 | 104 | 0.37 | 250 | 34 | 50 | 10 |
| NH3006 | 200 | 0.38 | 124 | 34 | 50 | 8 |
| NH3007 | 88.5 | 0.26 | 240 | 34 | 50 | 12 |

Note:
Average pore diameter ($w_{BJH}$), surface area ($S_{BET}$), and pore volume ($V_{BJH}$) calculated from nitrogen adsorption measurements. (1 nm is equivalent to 10 Å)

Advantageously, we have found that a single base etch step using ammonium hydroxide does not cause aggregation of the monodisperse particles. Particles produced by the process of Example 3 remain monodisperse following base etching with an ammonium hydroxide base etch solution.

Example 4

Preparation of Mesoporous Silica Spheres

Using the method of Example 2 but varying the concentration of ammonia resulted in particles with an increased average diameter. In this Example a mole ratio of TEOS:CTAB:MeOH:NH$_3$:H$_2$O of 0.0359:0.0032:12.36:0.0159:6.153 was used.

In a typical reaction, 1.25 g of CTAB was mixed in a 2 L beaker with 107.6 ml of H$_2$O and 500 ml of methanol and was left stirring (200 rpm) for 10 mins. 4 ml of NH$_4$OH was then added to the solution and the system was left stirring for a subsequent 10 mins. Finally 8 ml of TEOS was added to the solution in a one step addition and the stirring speed increased to 300 rpm. The reaction temperature was controlled at 16° C. The liquid suspension was filtered from the beaker after 24 hours and was subsequently washed with MeOH. It was air-dried at room temperature for 2 hours. A known mass of the as-synthesized material was then added to a pre-prepared agitated water-DMDA (3.3% v/v) emulsion system. After subsequent agitation for 1 hour the contents were transferred to a hydrothermal cell and placed in a 110° C. oven for 6 days. Calcination of the surfactant template was performed at 550° C. for 8 hr. Silica particles with an average diameter of 2.45 μm were obtained. The calcined product was then placed in a 0.05 M NaOH (1% w/w) solution and agitated at 200 rpm for 3 days, filtered and dried at 200° C. to increase the pore size to about 7.1 nm to 8.1 nm. Optionally, the Silica particles were 'etched' for a second time (under the same conditions: 0.05 M NaOH (1% w/w) solution and agitated at 200 rpm for 3 days) to further increase pore size to about 12.1 nm to 20.6 nm, filtered and dried at 200° C.

Example 5

Preparation of Mesoporous Silica Spheres

Using the method of Example 4 but replacing the sodium hydroxide base etching steps with a single ammonium hydroxide base etching step under the conditions for NH3002 to NH3007 listed in Table 2 above at 50° C. with agitation at 200 rpm, the pore size of the particles was increased to about 11.6 nm (NH3002), about 15.7 nm (NH3004), about 25.0 nm (NH3005), about 12.4 nm (NH3006) and about 24.0 nm (NH3007). Following base etching, particles were filtered and dried at 200° C.

Example 6

Preparation of Mesoporous Hybrid Silica Spheres

In a typical reaction, 1.25 g of CTAB was mixed in a 2 L beaker with 88 ml of $H_2O$ and 500 ml of methanol and was left stirring (200 rpm) for 10 mins. 32 ml of $NH_4OH$ was then added to the solution and the system was left stirring for a subsequent 10 mins. Finally, 7 ml of methyltrimethoxysilane was added to the solution in a one step addition and the stirring speed increased to 300 rpm. The reaction temperature was controlled at 16° C. The liquid suspension was filtered from the beaker after 24 hours and was subsequently washed with MeOH. It was air-dried at room temperature for 2 hours. A known mass of the as-synthesized material was then added to a pre-prepared agitated water-DMDA (3.3% v/v) emulsion system. After subsequent agitation for 1 hour the contents were transferred to a hydrothermal cell and placed in a 110° C. oven for 6 days. Removal of the surfactant template was performed using microwave extraction in ethanol. The hybrid silica particles were then 'etched' using ammonium hydroxide under the conditions outlined in Examples 3 and 5 above.

Example 7

Preparation of Mesoporous Bridged Hybrid Silica Spheres

In a typical reaction, 1.25 g of CTAB was mixed in a 2 L beaker with 88 ml of $H_2O$ and 500 ml of methanol and was left stirring (200 rpm) for 10 mins. 32 ml of $NH_4OH$ was then added to the solution and the system was left stirring for a subsequent 10 mins. Finally, 8.14 ml of 1,2-Bis (triethoxysilyl)ethane was added to the solution in a one step addition and the stirring speed increased to 300 rpm. The reaction temperature was controlled at 16° C. The liquid suspension was filtered from the beaker after 24 hours and was subsequently washed with MeOH. It was air-dried at room temperature for 2 hours. A known mass of the as-synthesized material was then added to a pre-prepared agitated water-DMDA (3.3% v/v) emulsion system. After subsequent agitation for 1 hour the contents were transferred to a hydrothermal cell and placed in a 110° C. oven for 6 days. Removal of the surfactant template was performed using microwave extraction in ethanol. The bridged silica particles were then 'etched' using ammonium hydroxide under the conditions outlined in Examples 3, 5, and 6 above.

The surface areas of the calcined mesoporous silica spheres were measured using nitrogen Brunauer Emmett Teller (BET) isotherms on a Micromeritics Gemini 2375 volumetric analyzer. Each sample was degassed for 12 hr at 200° C. prior to a BET measurement. The average pore size distribution of the calcined silicas was calculated on the Barrett Joyner Halanda (BJH) model from a 30-point BET surface area plot. Mesoporous silicas examined exhibited a Type-IV adsorption isotherm typical of mesoporous solids. Average pore diameters were calculated from the adsorption branch of the isotherm. A JEOL 2010 (0.5 nm resolution) electron microscope operating with a 100 kV accelerating voltage was used for transmission electron microscopy (TEM). Samples were dispersed in chloroform/ethanol, and a drop of the mixture was placed on a carbon-coated copper TEM grid. Scanning electron microscopy (SEM) measurements (0.05 μm resolution) were conducted on a JEOL 5510 SEM on samples placed on carbon tape and then adhered to a brass stub. Particle size distributions were measured on a Multisizer 3 Coulter Counter which is based on the electrical sensing zone (ESZ) technique.

FIG. 1 is a flow diagram of the process according to the invention, illustrating a general method of forming ordered mesoporous silica particles. First, a silica pre-sol solution is made. This may be agitated in a beaker under atmospheric conditions. The particles are then hydrolyzed in an amine water emulsion as shown in block 3. The particles are then calcined to create SDA-free particles (block 4). Finally, these particles are base etched, filtered and dried. Silicas can then be functionalized with organic species such as silanes containing alkyl chains ($C_n$, n=8-26) such as dimethyloctadecylchlorosilane ($CH_3(CH_2)_{17}Si(CH_3)_2Cl$; $C_{18}$), can be packed into chromatography columns, and used as stationary phases for UHPLC (block 7). If a hybrid silica precursor is used to make a pre-sol solution, the resulting particles are already functionalized with an organic species. Therefore, depending on the final application/use of the microparticles synthesized, it may not be necessary to further functionalize hybrid silica particles.

Figure 2A:
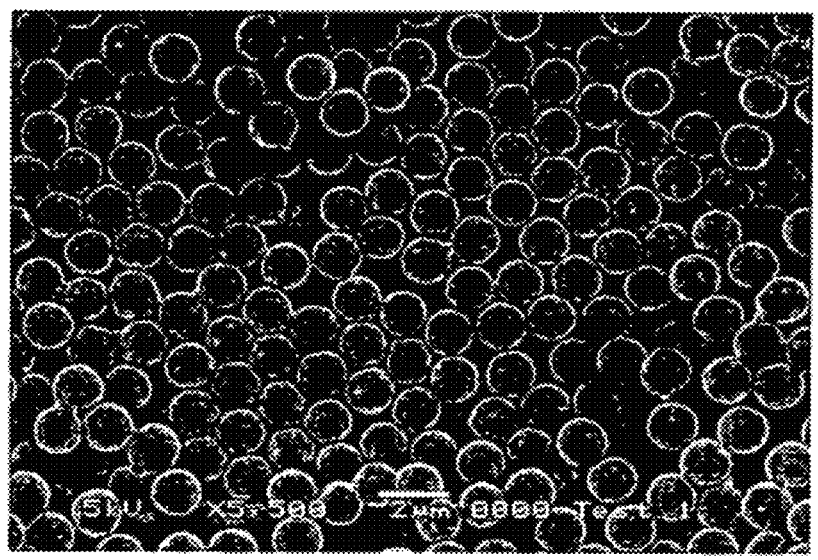
FIG. 2A is a scanning electron micrograph image of porous silica spheres prepared by a method of the invention from the moles ratios TEOS:CTAB:MeOH:NH$_3$:H$_2$O of 0.0359:0.003:12.36:0.5:6.15 shown at ×5,500 magnification.
Figure 2B:
FIG. 2B is a scanning electron micrograph image of porous silica spheres prepared by a method of the invention from the moles ratios TEOS:CTAB:MeOH:NH$_3$:H$_2$O of 0.0359:0.003:12.36:0.5:6.15 shown at ×18,000 magnification.

FIGS. 2A-B shows an SEM analysis of silica microspheres synthesized from the above method. The average particle size measured was 1.4 μm. The SEM image confirms that the surface of the sphere is smooth and free from major defects. The particle size of the modified SFB method may be controlled by altering the reactant type, stoichiometry and experimental conditions. It is useful to compare the processing and particle size control of the modified SFB method with the original SFB method. Stöber et al.[9] systematically varied reaction parameters so that silica particle diameters could be tailored from 0.05 μm to 2 μm in diameter. Bogush et al.[16] extended this work, focusing on the TEOS, EtOH, $NH_3$, $H_2O$ system to establish concentration ranges in which size-monodispersity is maintained. In both studies particle size was not found to be dependent on batch size or method of mixing. The mass fraction and particle size may also be increased by a seeded growth technique.

Figure 3:
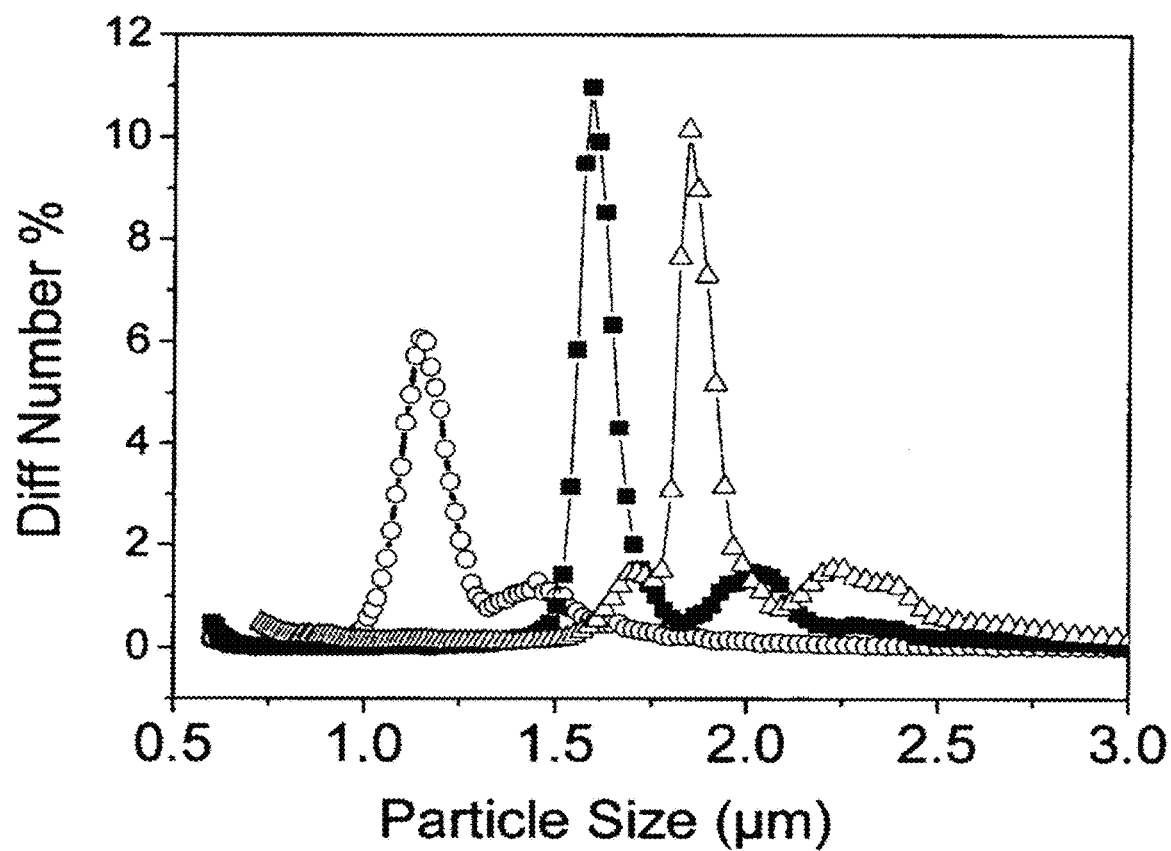
FIG. 3 illustrates particle size measurements of the porous silica particles prepared under various agitation speeds (○) 200 rpm: (■) 300 rpm; and (Δ) 400 rpm.
Figure 4A:
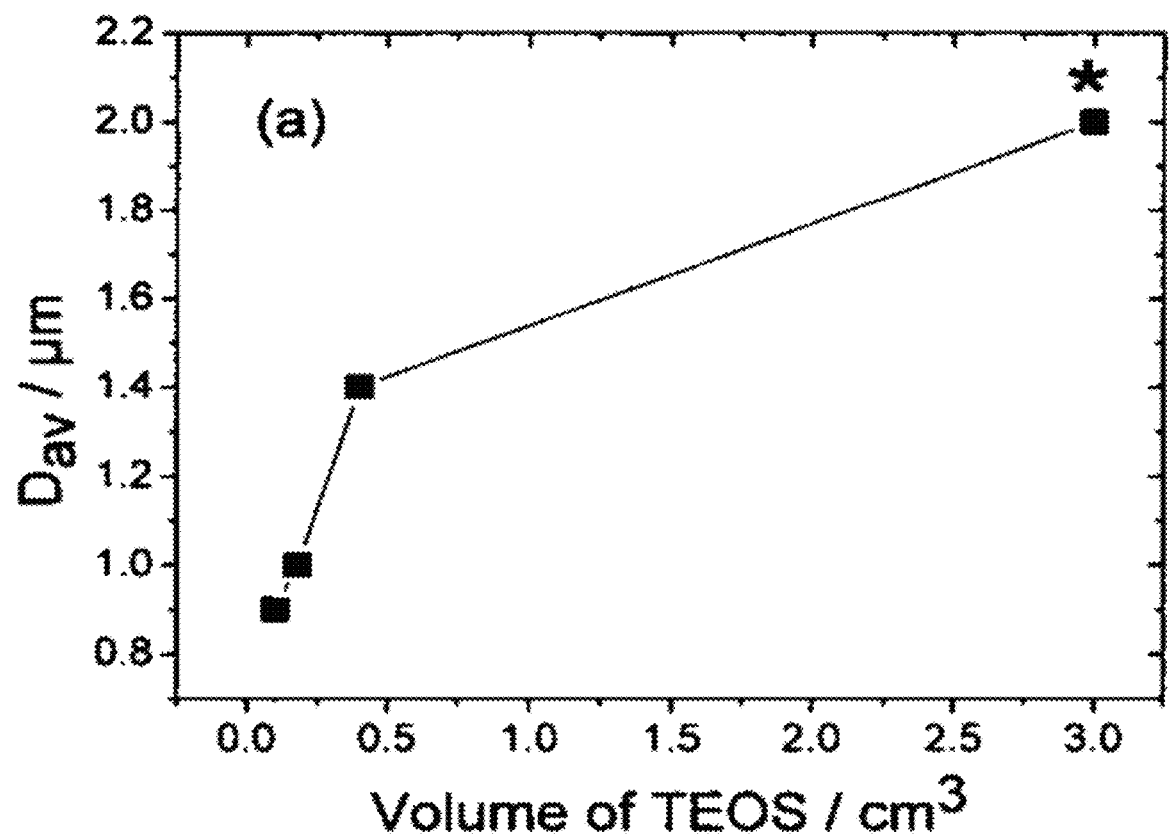
FIG. 4A is a graph showing the effect of changing experimental conditions during the synthesis process on the average particle size produced from a moles ratio of TEOS:CTAB:MeOH:NH$_3$:H$_2$O of 00359:0.032:12.36:0.0505:6.153 as measured by SEM. The experimental condition changed was volume of TEOS. (*=polydisperse size, largest particle size taken).
Figure 4B:
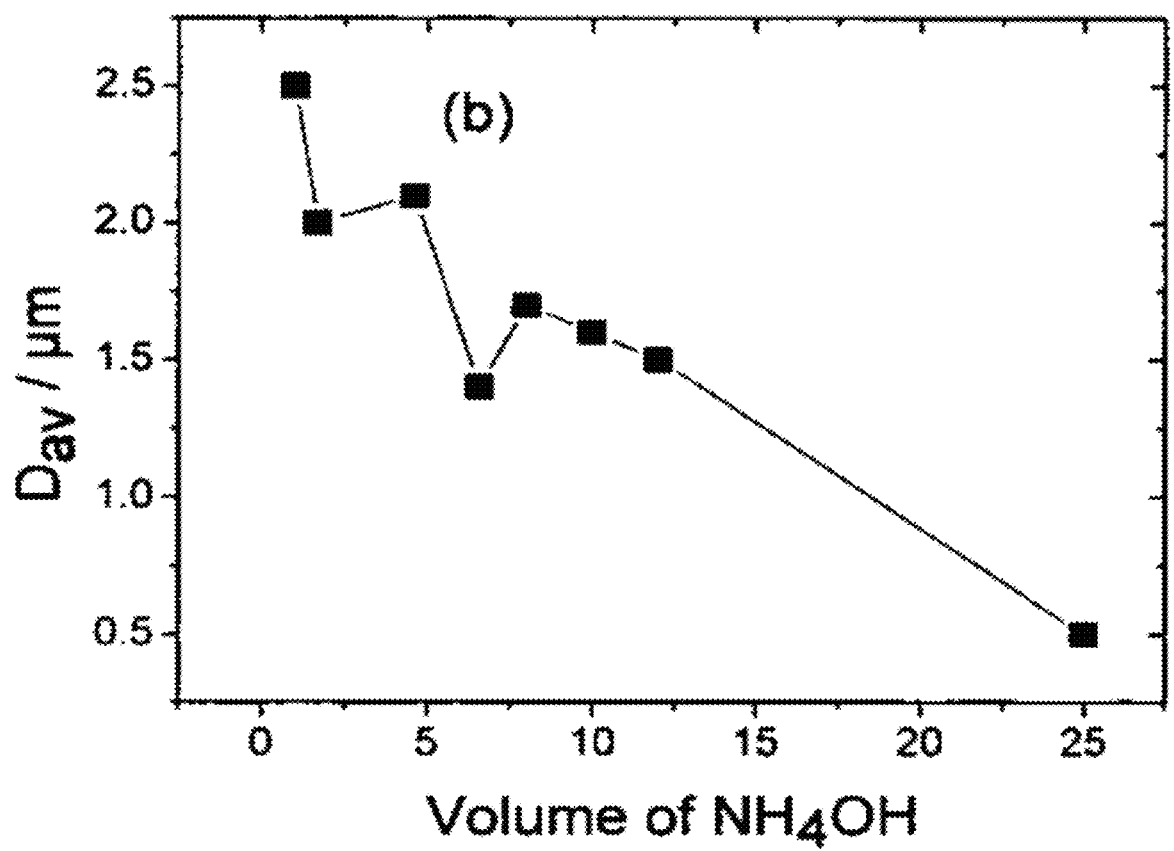
FIG. 4B is a graph showing the effect of changing experimental conditions during the synthesis process on the average particle size produced from a moles ratio of TEOS:CTAB:MeOH:NH$_3$:H$_2$O of 00359:0.032:12.36:0.0505:6.153 as measured by SEM. The experimental condition changed was volume of ammonium hydroxide.
Figure 4C:
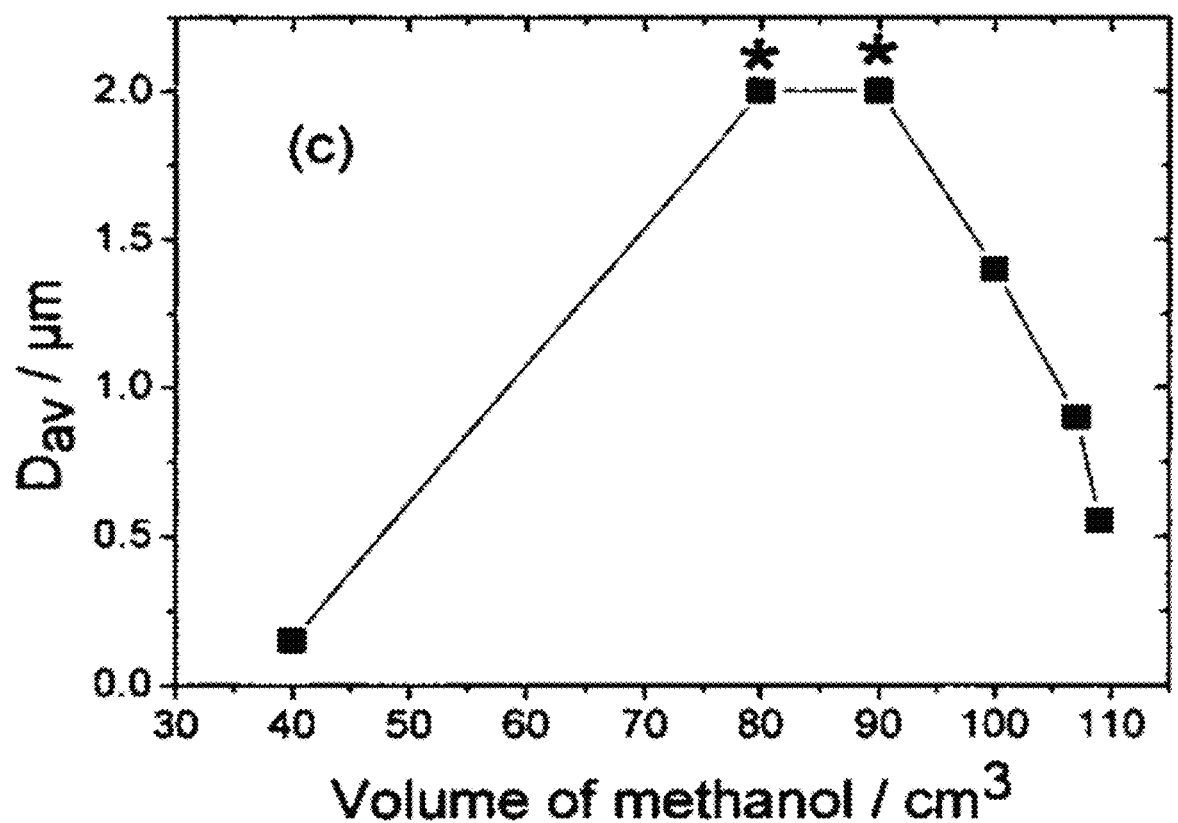
FIG. 4C is a graph showing the effect of changing experimental conditions during the synthesis process on the average particle size produced from a moles ratio of TEOS:CTAB:MeOH:NH$_3$:H$_2$O of 00359:0.032:12.36:0.0505:6.153 as measured by SEM. The experimental condition changed was volume of methanol (*=polydisperse size, largest particle size taken).
Figure 4D:
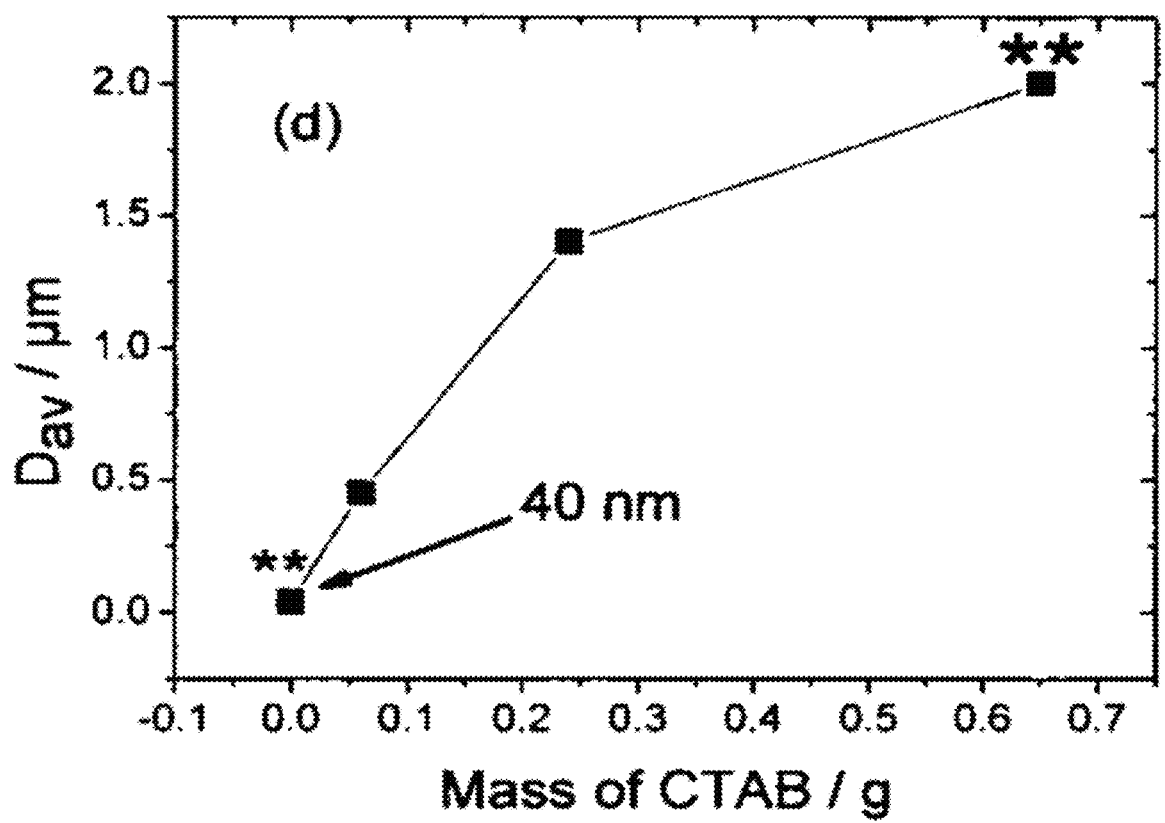
FIG. 4D is a graph showing the effect of changing experimental conditions during the synthesis process on the average particle size produced from a moles ratio of TEOS:CTAB:MeOH:NH$_3$:H$_2$O of 00359:0.032:12.36:0.0505:6.153 as measured by SEM. The experimental condition changed was mass of CTAB**=particle agglomeration, no discrete particles observed).
Figure 4E:
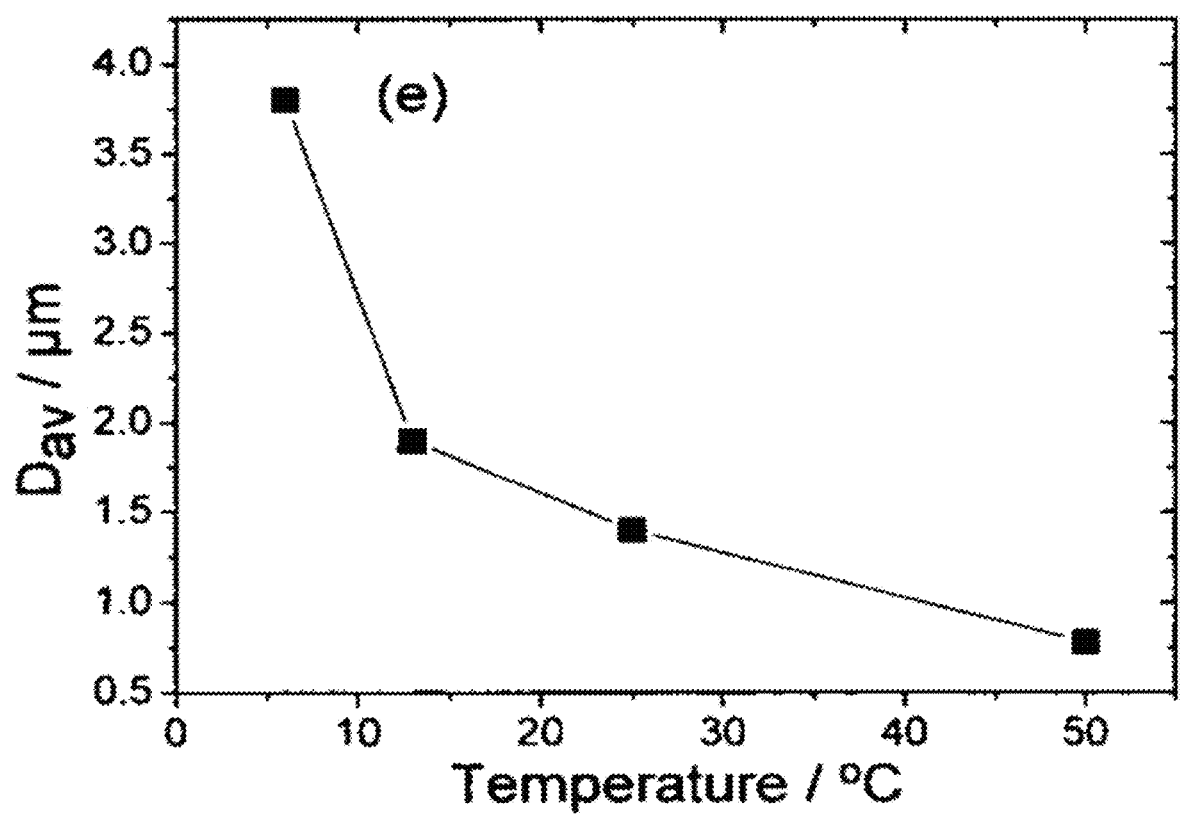
FIG. 4E is a graph showing the effect of changing experimental conditions during the synthesis process on the average particle size produced from a moles ratio of TEOS:CTAB:MeOH:NH$_3$:H$_2$O of 00359:0.032:12.36:0.0505:6.153 as measured by SEM. The experimental condition changed was reaction temperature.

FIG. 3 shows particle size distribution profiles for silica synthesized using the above method. Modification of the agitation speed leads to varying particle sizes. (Open Triangles 400 rpm, closed squares 300 rpm, and open circles 200 rpm).

FIGS. 4A to E show the effect of altering experimental conditions on the resultant particle size.

Figure 5A:
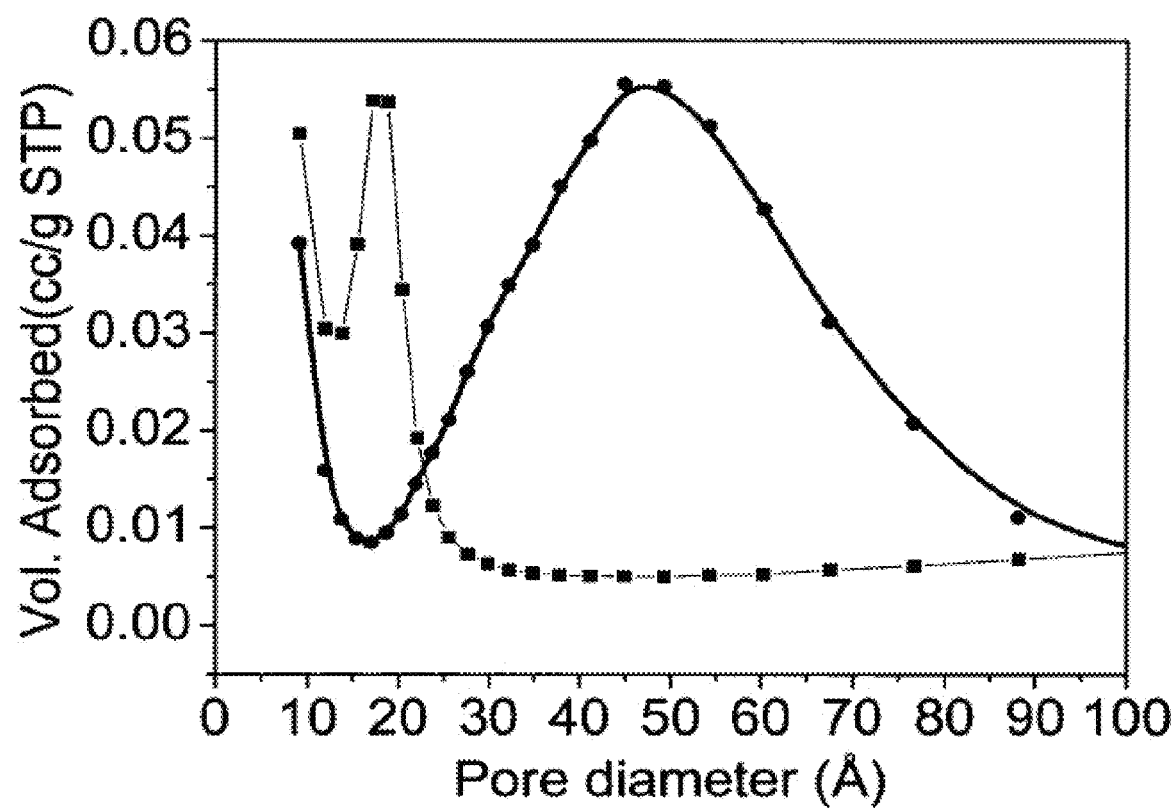
FIG. 5A is a graph showing the Barrett, Joyner, Halenda (BJH) pore size measurements of porous silica particle produced at a chemical molar ratio of TEOS:CTAB:MeOH:NH$_3$:H$_2$O of 0.0359:0.003:12.36:0.5:6.15 untreated (■) and treated (•) with a neutral amine (DMDA)
Figure 5B:
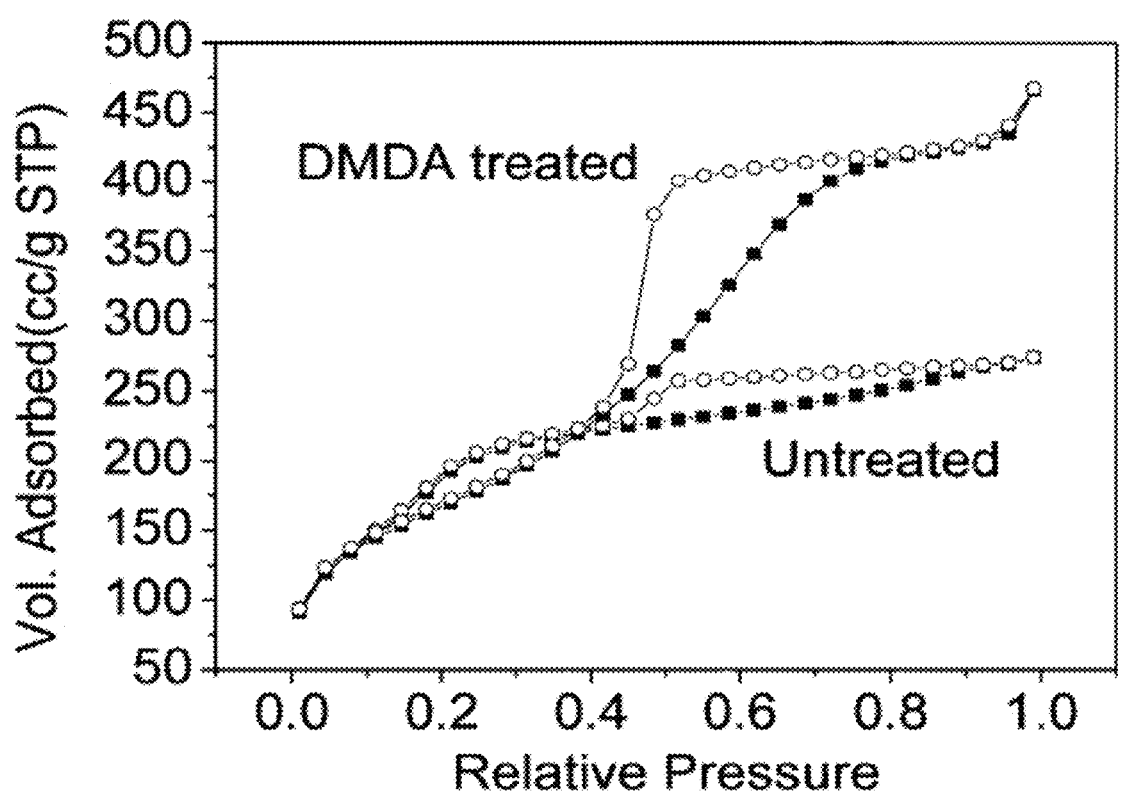
FIG. 5B is a graph showing nitrogen adsorption (■) and desorption (○) isotherms of DMDA treated and untreated particles.

A post synthesis hydrothermal treatment in water amine emulsions was applied to expand the pore size. FIG. 5B shows nitrogen adsorption (closed squares) and desorption isotherms (open circles) isotherms of hydrothermally treated (labelled DMDA treated) and untreated particles (labelled Untreated). There is a clear transition from a Type 1 microporous (<2 nm) to a Type 4 mesoporous (2-50 nm) adsorption isotherm according to IUPAC classification.[17] FIG. 5A depicts the pore size distribution profiles of an untreated (closed squares) and hydrothermally treated (closed circles) silica sample. As shown in Table 1 there is a threefold increase in average pore diameter, an increase in pore volume and a decrease in surface area. No noticeable change in sphere morphology was observed by scanning electron microscopy. In agreement with Sayari,[14] the pore wall thickness of the expanded silica was not found to change significantly.

The pore diameter may be further increased by a base etch in sodium hydroxide or ammonium hydroxide solution. FIG.

Figure 6A:
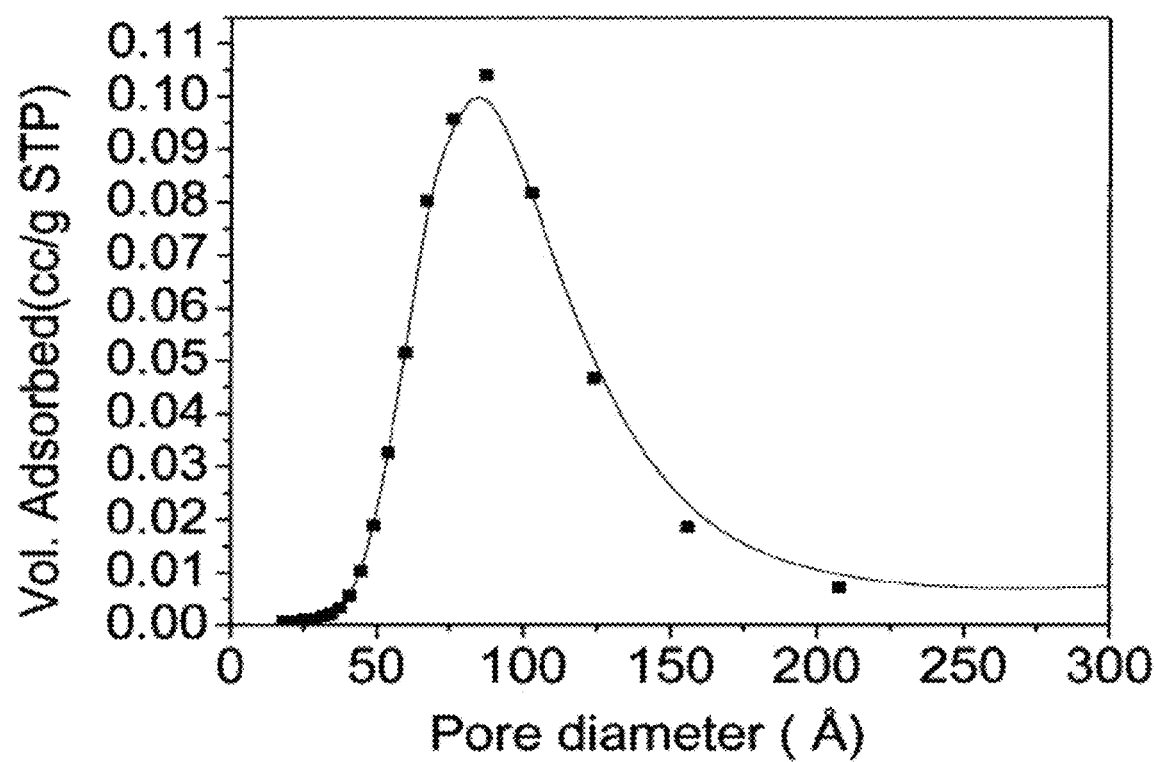
FIG. 6A is a graph showing the BJH pore size measurement of sodium hydroxide etched particles after base etching (controlled dissolution) for 3 days.
Figure 6B:
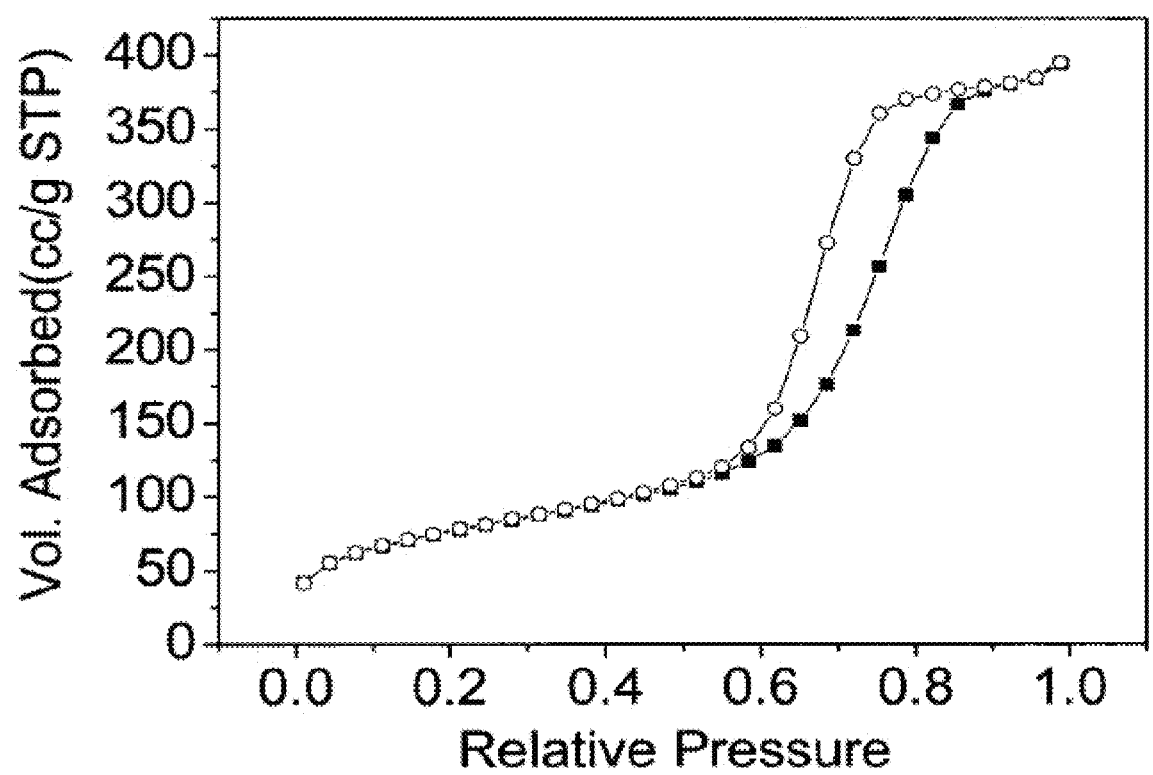
FIG. 6B is a graph showing nitrogen adsorption (■) and desorption (○) isotherms of sodium hydroxide etched particles after base etching (controlled dissolution) for 3 days.

6B shows a nitrogen adsorption (closed squares) and desorption (open circles) isotherms of sodium hydroxide etched spheres. The average pore diameter is 8.5 nm taken from the Pore size distribution profile shown in FIG. 6A. Table 1 indicates that there is a four fold increase in the pore size after base etching (controlled dissolution).

Figure 7A:
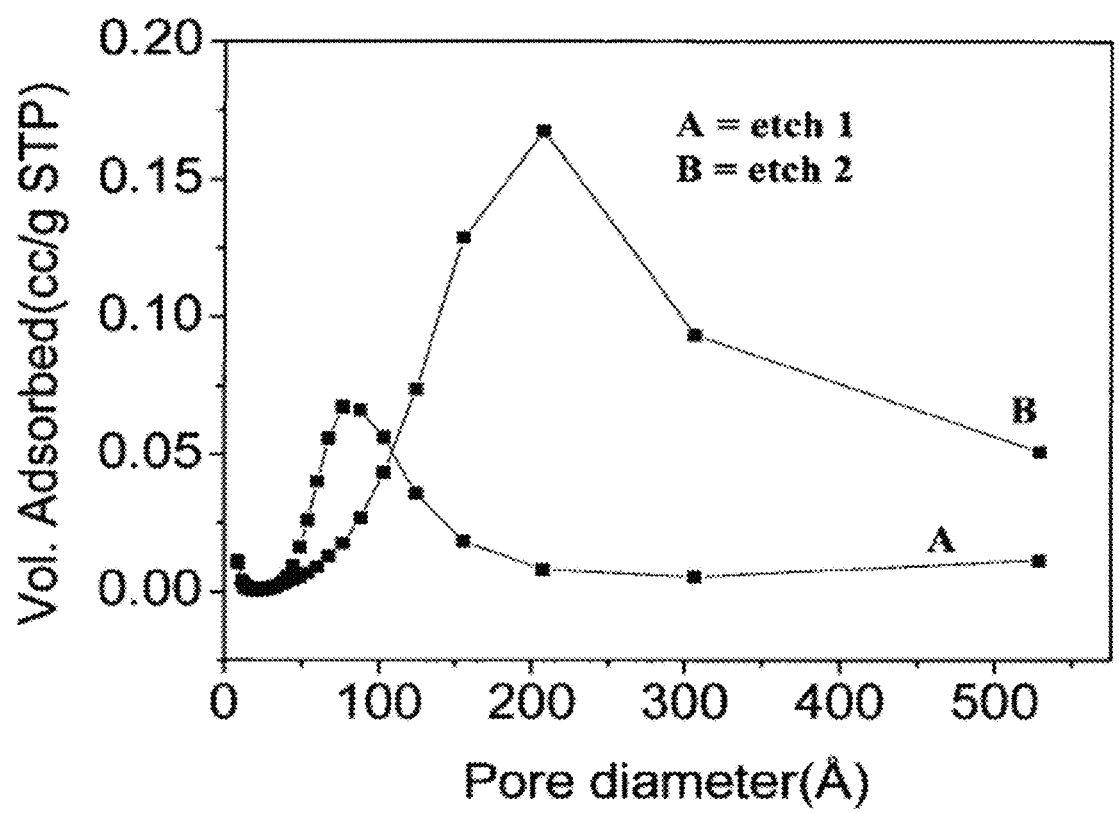
FIG. 7A is a graph showing the BJH pore size measurement of sodium hydroxide etched particles after base etching (controlled dissolution) for 3 days (line A) and after a double base etching (controlled dissolution) (line B)
Figure 7B:
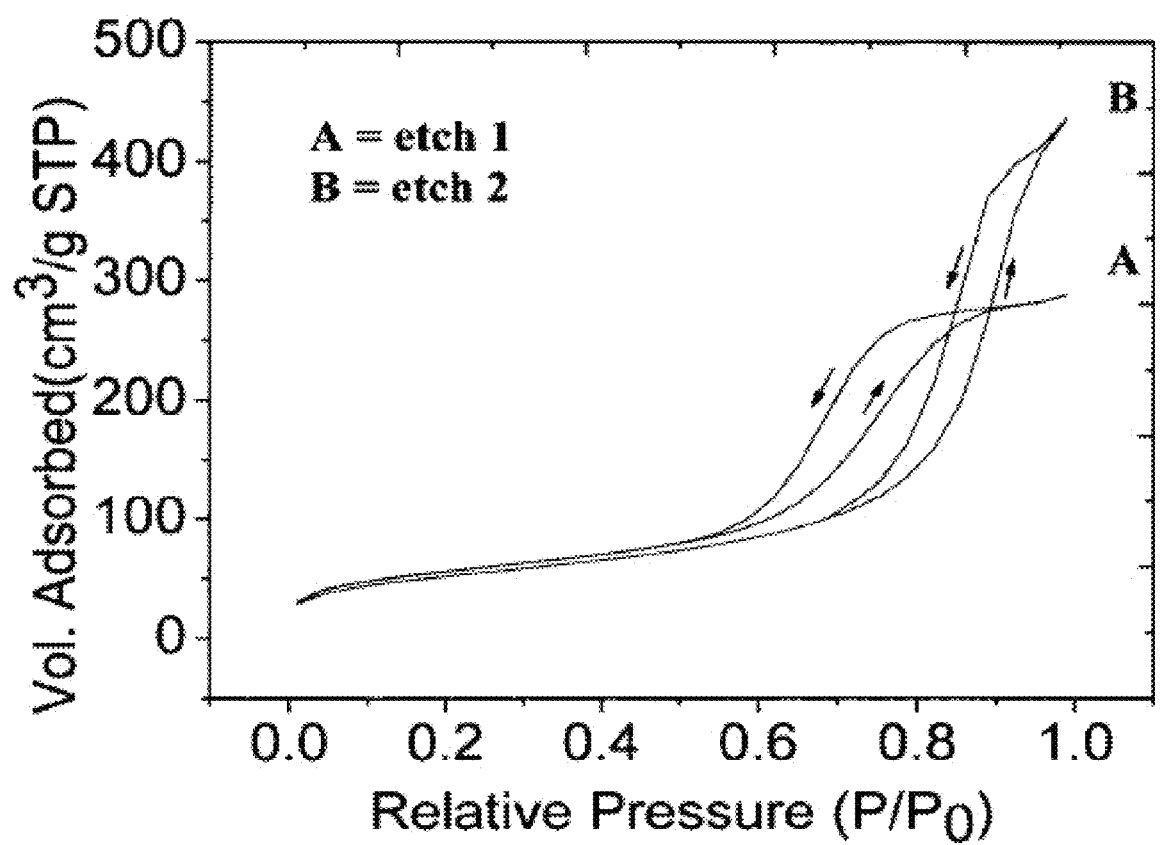
FIG. 7B is a graph showing nitrogen adsorption (↑) and desorption (↓) isotherms of sodium hydroxide etched particles after base etching (controlled dissolution) for 3 days (line A) and after a double base etching (controlled dissolution) (line B).

FIG. 7B shows a nitrogen adsorption (↑) and desorption (↓) isotherms of silica spheres that have been etched once with sodium hydroxide (line A) and have been double etched with sodium hydroxide (line B). The average pore diameter can be seen from the Pore size distribution profile shown in FIG. 7A for spheres that have been etched once (line A) and have been double etched (line B).

Figure 8A:
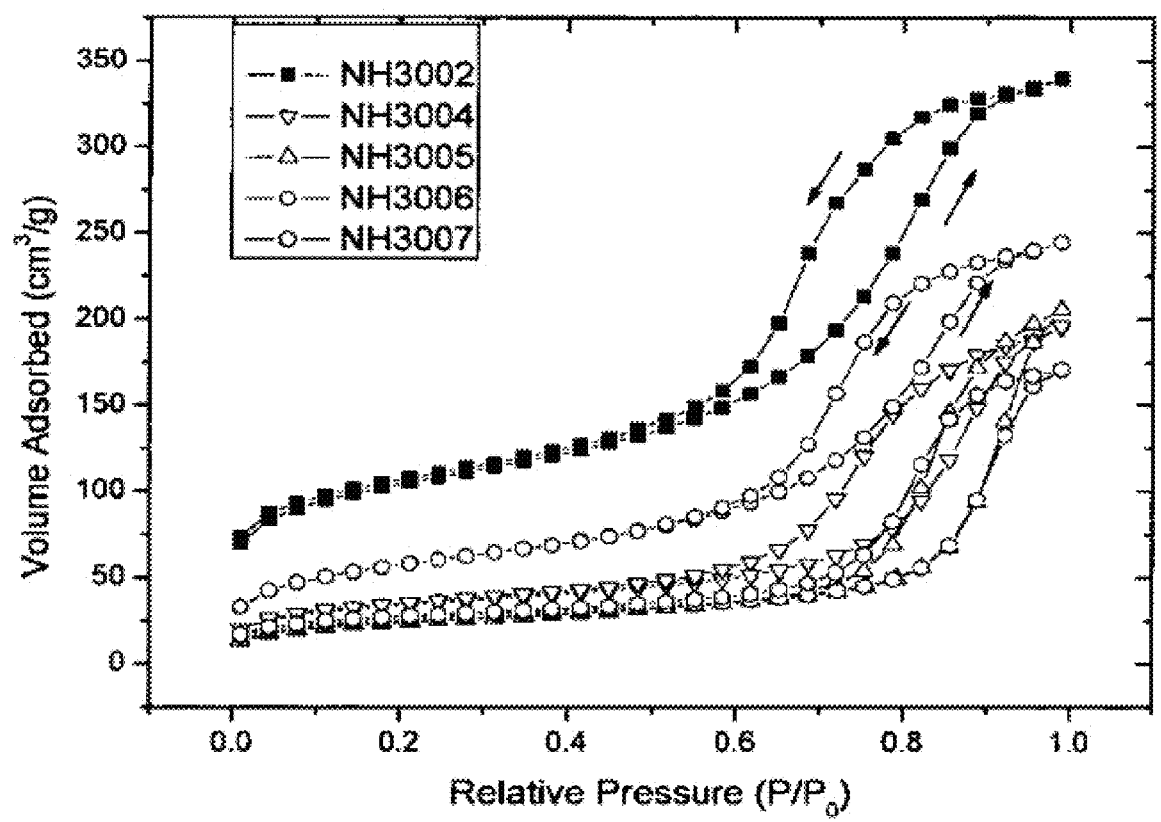
FIG. 8A is a graph showing nitrogen absorption (↑) and desorption (↓) isotherms of ammonium hydroxide base etched particles after base etching under different experimental conditions (different concentrations of ammonium hydroxide and base etching for different lengths of time—see Table 2 for the experimental conditions)
Figure 8B:
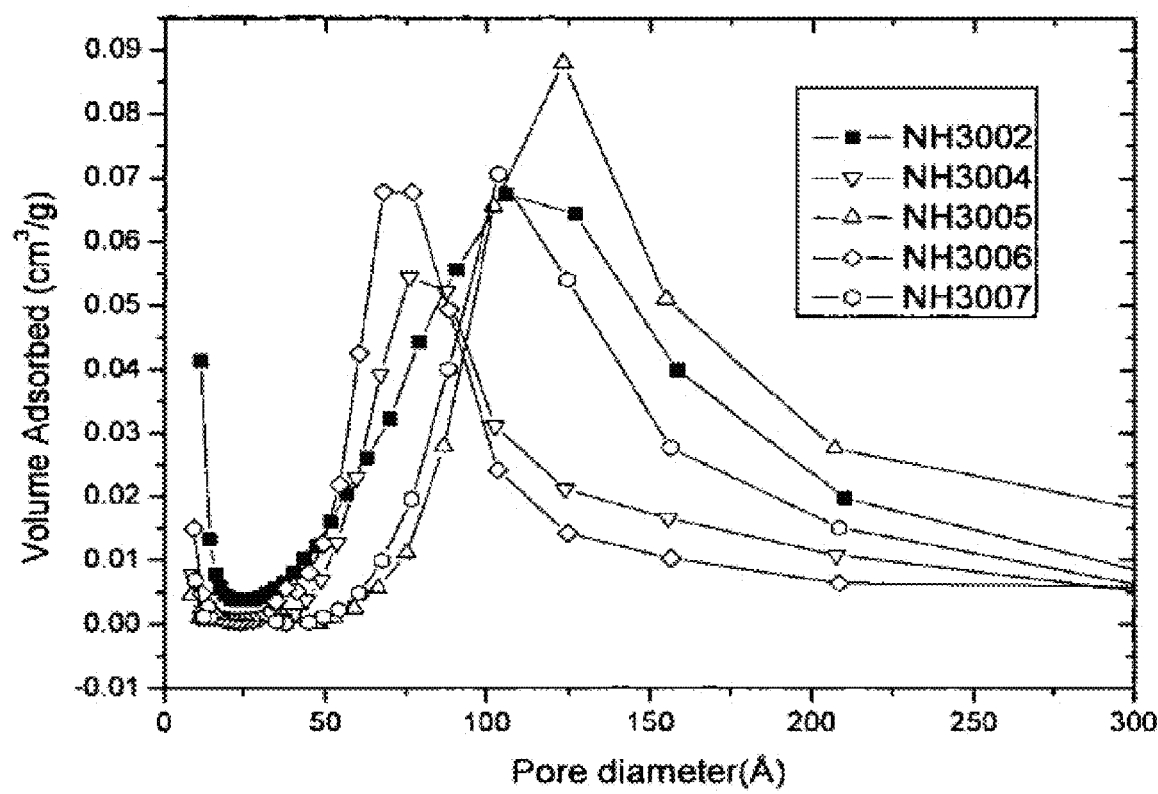
FIG. 8B is a graph showing the BJH pore size measurement of ammonium hydroxide etched particles after base etching under different experimental conditions (different concentrations of ammonium hydroxide and base etching for different lengths of time—see Table 2 for the experimental conditions).

FIG. 8A shows nitrogen adsorption (↑) and desorption (↓) isotherms of silica spheres that have been etched with an ammonium hydroxide etching solution under various conditions (see Table 2 above for the base etching conditions). The average pore diameter can be seen from the pore size distribution profile in FIG. 8(B) for spheres that have been etched with an ammonium hydroxide base etching solution under various conditions (see Table 2 above for the base etching conditions).

Figure 9:
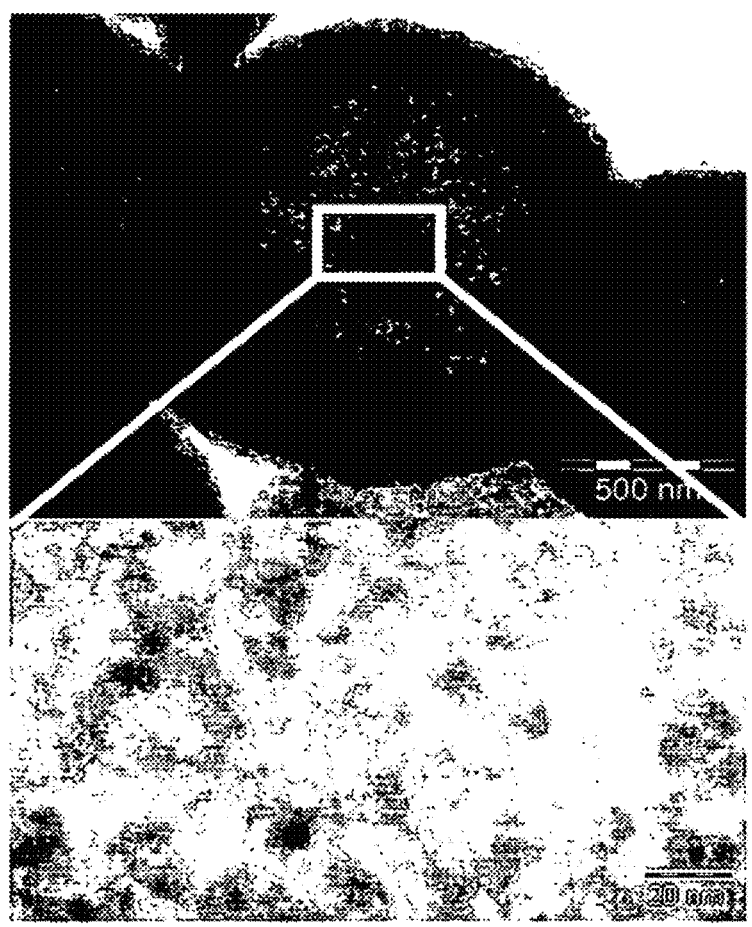
FIG. 9 is a TEM image of the particles produced by a process of the invention showing the expanded pore system.

FIG. 9 is a TEM image of the random pore structure within the spheres after base etching in 0.05 M NaOH (3 days). Pore sizes of up to 50 nm can be created after suitable base etch conditions i.e. repeated base etching procedures. Typically pore sizes in the region of about 2 to 25 nm or about 2 to 15 nm are achieved.

Figure 10:
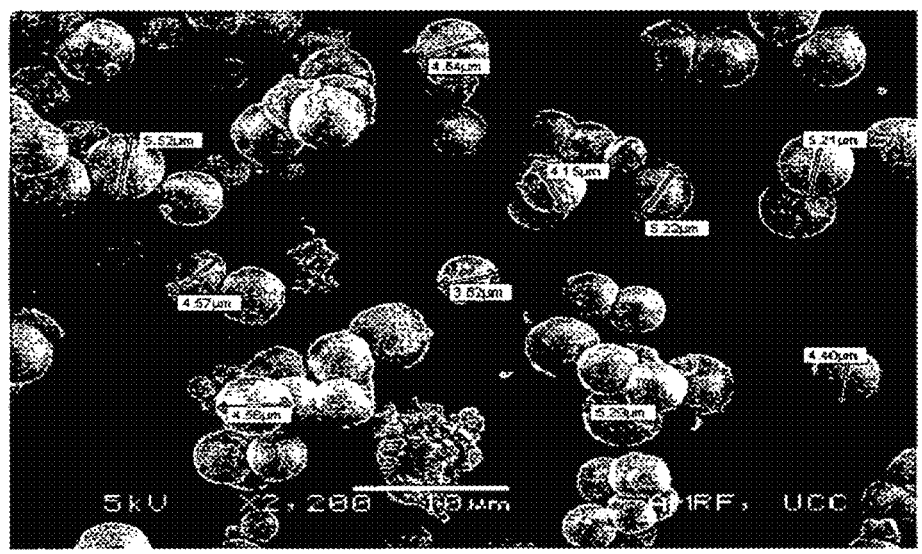
FIG. 10 is a scanning electron micrograph image of porous silica spheres prepared by a process of the invention from the moles ratios TEOS:CTAB:MeOH:NH$_3$:H$_2$O of 0.0359:0.003:12.36:0.5:6.15 shown at ×2,200 magnification. (Reaction temperature was −17° C.).

FIG. 10 is a scanning electron micrograph image of porous silica spheres prepared from a moles ratio of TEOS:CTAB:MeOH:NH$_3$:H$_2$O of 0.0359:0.003:12.36:0.5:6.15 under a reaction temperature of −17° C. The spheres have an average diameter of about 4.7 μm.

The invention is not limited to the embodiments described herein but may be varied in construction and detail.

REFERENCES (1) Halasz, I.; Endele, R.; Asshauer, J., J Chromatogr 1975, 12, 12.
(2) MacNair, J. E.; Lewis, K. C.; Jorgenson, J. W., Anal. Chem 1997, 69, 983.
(3) MacNair, J. E.; Patel, K. D.; Jorgenson, J. W., Anal. Chem. 1999.
(4) Waters corporation website
(5) Beck, J. S.; Vartulli, J. C.; Roth, W. J.; Leonowicz, M. E.; Kresge, C. T.; Schmitt, K. D.; Chu, C. T.; Olson, D. H.; Sheppard, E.; McMullen, S. B.; Higgins, J. B.; Schlenker, J. L., J. Am. Chem. Soc. 1992, 114, 10834.
(6) Beck, J. S., U.S. Patent, The swelling of mesoporous silica using 135TMB. 1991.
(7) Selvam, P.; Bhatia, S. K.; Sonwane, C. G., Ind. Eng. Chem. Res. 2001, 40, 3237.
(8) Martin, T.; Galarneau, A.; Di Renzo, F.; Brunel, D.; Fajula, F., Chem. Mater. 2004, 16, 1725.
(9) Stöber, W.; Fink, A.; Bohn, E., J. Colloid Interface Sci. 1968, 26, 62.
(10) Grun, M.; Lauer, I.; Unger, K. K., Adv. Mater 1997, 9, 254.
(11) Yano, K.; Fukushima, Y., J. Mater. Chem. 2003, 13, 2577.
(12) Shimura, S.; Ogawa, M., Bull. Chem. Soc. Jpn. 2005, 78, 1154.
(13) Kruk, M.; Jaroniec, M.; Sayari, A., Micro. Meso. Mat. 2000, 35, 545.
(14) Sayari, A., Angew. Chem. Int. Ed., 2000, 39, 2920.
(15) Unger, K. K.; Kumar, D.; Grun, M.; Buchel, G.; Ludtke, S.; Adam, T.; Schumacher, K.; Renker, S., J. Chromatogr. A 2000, 892, 47.
(16) Bogush, G. H.; Zukoski, C. F. J., Colloid Interface Sci 1988, 104, 94.
(17) Barton, T. J.; Bull, L. M.; Klemperer, W. G.; Loy, D. A.; McEnaney, B.; Misono, M.; Monson, P. A.; Pez, G.; Scherer, G. W.; Vartuli, J. C.; Yaghi, O. M., Chem. Mater 1999, 11, 2633.
(18) Grun, M., Buchel, G., Kumar, D., Schumacher, K., Bidlingmaier, B., Unger, K. K., Studies in surface science and catalysis 2000, 128: 155-165.

The invention claimed is:

1. A method for synthesizing discrete, spherical mesoporous silica microparticles having a random pore structure comprising the steps of:
producing mesoporous particles of silica with an average diameter of up to 50 μm by preparing a sol from an ammonium catalyzed hydrolysis and condensation reaction of a pre-sol solution comprising a silica precursor and a structure directing agent which is a surfactant dissolved in a mixed solvent system comprising water and an alcohol which is one or more of ethanol, methanol, 1-propanol, 2-propanol, and 1-butanol, wherein the mole ratio of silica precursor:structure directing agent:alcohol:water:ammonia catalyst is in the range from (0.001-0.08):(0.001-0.006):(8-14):(2-10):(0.05-1.5);
hydrothermally treating the particles in an amine-water emulsion to increase the pore size;
heating the particles to a temperature of 400° C. to 800° C. or treating the particles with microwave irradiation to remove residual structure directing agent; and
further increasing the pore size of the particles using an etching process utilising a base catalyst which is one or more of ammonium hydroxide, sodium hydroxide, potassium hydroxide, lithium hydroxide and calcium hydroxide;
wherein the silica precursor is one or more selected from the group consisting of: tetraethoxysilane (TEOS), tetramethoxysilane (TMOS), tetrapropoxysilane (TPOS), tetrabutoxysilane (TBOS), tetra-acetoxysilane and tetrachlorosilane or an organic derivative thereof;
wherein the organic derivative has the formula:

$R_nSiX_{(4-n)}$ wherein:
R is an organic radical;
X is a hydrolysable group selected from one or more of the group consisting of: halide, acetoxy, and alkoxy; and
n is an integer from 1 to 4,
or the silica precursor is a hybrid silica precursor selected from the group consisting of: dimethyldimethoxysilane, methyltriethoxysilane, methyltrimethoxysilane, ethyltrimethoxysilane, n-propyltrimethoxysilane, isobutyltriethoxysilane, isobutyltrimethoxysilane, phenyltrimethoxysilane, n-octyltriethoxysilane, iso-octyltrimethoxysilane, or a bridged hybrid silica precursor having the general formula:

$R_nX_{(3-n)}Si-R'-Si-R_nX_{(3-n)}$ wherein:
R is an organic radical;
X is halide, acetoxy, or alkoxy;
R' is methyl, ethyl, propyl or butyl; and
n is 1 or 2;

the surfactant has the structure $(CH_3)_3N+C_xH_y$, wherein x is an integer between 12 and 20, and y is an integer between 23 and 41.

2. The method of claim 1, wherein the porous particles are hydrothermally treated at a temperature of between 70° C. and 150° C.

3. The method of claim 1, wherein the amine to water ratio is between 1 v/v % and 10 v/v %.

4. The method of claim 1, wherein the amine is N,N-dimethyldecylamine, trioctylamine, trimethylamine, tridodecylamine, trimethylamine, or combinations thereof.

5. The method of claim 1, wherein the structure directing agent is cetyltrimethylammonium bromide (CTAB).

6. The method of claim 1, wherein in the etching process:
   (i) the base catalyst is present in a concentration of between 0.01 M and 1 M;
   (ii) the particles are etched for up to 12 hours or for between 1 day to 5 days;
   (iii) the particles are etched at a temperature of 50° C.;
   (iv) the etching process comprises a silica chelating or complexing agent;
   (v) the base catalyst is ammonium hydroxide;
   (vi) or combinations thereof.

7. The method of claim 1, wherein:
   (i) the particles are treated for 1 hour to 24 hours to remove residual structure directing agent;
   (ii) the particles are treated in the presence of an alcohol to remove residual structure directing agent; or
   (iii) a combination of (i) and (ii).

8. The method of claim 1, wherein the silica precursor is 1,2-Bis(triethoxysilyl)ethane.

9. The method of claim 1, wherein
   (i) the mole ratio of silica precursor:structure directing agent:alcohol:water:ammonia catalyst is 0.0359: 0.0032:12.36:6.153:0.505;
   (ii) the pre-sol solution is maintained at a temperature of −5° C. to 80° C.;
   (iii) the pre-sol solution is agitated;
   (iv) a dopant compound is added to the pre-sol solution; or
   (v) any combination of (i)-(iv).

* * * * *